US009735901B2

(12) United States Patent
Yoshizawa

(10) Patent No.: US 9,735,901 B2
(45) Date of Patent: Aug. 15, 2017

(54) COMMUNICATION CONTROL DEVICE, COMMUNICATION CONTROL METHOD, AND TERMINAL

(71) Applicant: Sony Corporation, Tokyo (JP)

(72) Inventor: Atsushi Yoshizawa, Kanagawa (JP)

(73) Assignee: Sony Corporation, Tokyo (JP)

( * ) Notice: Subject to any disclaimer, the term of this patent is extended or adjusted under 35 U.S.C. 154(b) by 223 days.

(21) Appl. No.: 14/410,613

(22) PCT Filed: Apr. 18, 2013

(86) PCT No.: PCT/JP2013/061502
§ 371 (c)(1),
(2) Date: Dec. 23, 2014

(87) PCT Pub. No.: WO2014/010289
PCT Pub. Date: Jan. 16, 2014

(65) Prior Publication Data
US 2015/0333852 A1    Nov. 19, 2015

(30) Foreign Application Priority Data
Jul. 9, 2012   (JP) ................................ 2012-153364

(51) Int. Cl.
H04B 17/345   (2015.01)
H04W 36/04    (2009.01)
(Continued)

(52) U.S. Cl.
CPC ......... *H04B 17/345* (2015.01); *H04B 17/382* (2015.01); *H04W 36/04* (2013.01);
(Continued)

(58) Field of Classification Search
CPC . H04B 17/345; H04B 17/382; H04W 52/244; H04W 52/40; H04W 36/20; H04W 36/04; H04W 36/14; H04J 11/0023
(Continued)

(56) References Cited

U.S. PATENT DOCUMENTS

2001/0055288 A1   12/2001   Uebayashi et al.
2002/0105913 A1   8/2002    Miya
(Continued)

FOREIGN PATENT DOCUMENTS

JP   2001-346265 A   12/2001
JP   2001-358644 A   12/2001
(Continued)

OTHER PUBLICATIONS

Office Action for JP Patent Application No. 2014-524671, dated Apr. 18, 2017, 6 pages.
(Continued)

Primary Examiner — Obaidul Huq
(74) Attorney, Agent, or Firm — Chip Law Group

(57) ABSTRACT

Provided is a communication control device including a wireless communication unit configured to communicate wirelessly with a terminal in a macrocell that is allowed to communicate wirelessly in FDD mode using a frequency band, the macrocell being overlapped in part or in whole with a small cell that is allowed to communicate wirelessly in TDD mode using the frequency band, an acquisition unit configured to acquire a measurement result during handover of a terminal, the handover allowing the terminal to communicate wirelessly in the small cell, the measurement result being obtained by measuring a degree of interference between the terminal and one or more other terminals that
(Continued)

communicate wirelessly in the macrocell, and a controller configured to control the handover based on the measurement result.

19 Claims, 12 Drawing Sheets

(51) Int. Cl.
    *H04W 36/20*     (2009.01)
    *H04W 52/40*     (2009.01)
    *H04W 52/24*     (2009.01)
    *H04B 17/382*     (2015.01)
    *H04J 11/00*     (2006.01)
    *H04W 36/14*     (2009.01)

(52) U.S. Cl.
    CPC ......... *H04W 36/20* (2013.01); *H04W 52/244* (2013.01); *H04W 52/40* (2013.01); *H04J 11/0023* (2013.01); *H04W 36/14* (2013.01)

(58) Field of Classification Search
    USPC .................................................. 370/241, 252
    See application file for complete search history.

(56) References Cited

U.S. PATENT DOCUMENTS

| | | | |
|---|---|---|---|
| 2002/0105935 A1 | 8/2002 | Miya | |
| 2009/0163210 A1* | 6/2009 | Abedi | H04W 16/14 455/436 |
| 2011/0306347 A1 | 12/2011 | Choi et al. | |
| 2012/0142392 A1* | 6/2012 | Patel | H04W 52/143 455/522 |
| 2015/0016331 A1* | 1/2015 | Kim | H04J 11/005 370/312 |

FOREIGN PATENT DOCUMENTS

| | | |
|---|---|---|
| JP | 2002-010339 A | 1/2002 |
| JP | 2011-211369 A | 10/2011 |
| JP | 2012-015838 A | 1/2012 |
| JP | 2012-080347 A | 4/2012 |
| JP | 2012-124855 A | 6/2012 |
| WO | 2012/073371 A1 | 6/2012 |
| WO | WO 2012/073371 A1 | 6/2012 |

OTHER PUBLICATIONS

Povey, et al., "A Review of Time Division Duplex—CDMA Techniques", IEEE 1998, pp. 630-633.

* cited by examiner

COMMUNICATION CONTROL DEVICE, COMMUNICATION CONTROL METHOD, AND TERMINAL

TECHNICAL FIELD

The present disclosure relates to a communication control device, a communication control method, and a terminal.

BACKGROUND ART

With the current widespread use of smartphones, the increase in data traffic in a cellular system becomes an issue. Thus, the increase in communication channel capacity in a cellular system is increasingly important for mobile network operators.

In order to increase the communication channel capacity, for example, mobile network operators deploy a small cell such as picocell and femtocell within a macrocell. In other words, mobile network operators employ heterogeneous network deployment. This deployment enables the mobile network operators to achieve larger communication channel capacity through a cell-splitting gain. However, in such a heterogeneous network, interference may occur between a small cell and a macrocell, and thus a technique to prevent the occurrence of interference between a small cell and a macrocell has been studied.

For example, Patent Literature 1 discloses a technology that prevents the occurrence of interference by adjusting appropriately transmission power of terminals and a base station using a cooperation manager when the frequency spectrum is shared between a small cell and a macrocell in a heterogeneous network.

CITATION LIST

Patent Literature

Patent Literature 1: JP 2011-211369A

SUMMARY OF INVENTION

Technical Problem

However, in Patent Literature 1, no consideration is taken of the interference that may occur in a particular case in which handover of a terminal is performed in a heterogeneous network. Thus, interference may occur between a macrocell and a small cell, for example, during handover of a terminal.

Therefore, it is desirable to provide a mechanism capable of reducing the interference that may occur during handover in a heterogeneous network.

Solution to Problem

According to the present disclosure, there is provided a communication control device including a wireless communication unit configured to communicate wirelessly with a terminal in a macrocell that is allowed to communicate wirelessly in FDD mode using a frequency band, the macrocell being overlapped in part or in whole with a small cell that is allowed to communicate wirelessly in TDD mode using the frequency band, an acquisition unit configured to acquire a measurement result during handover of a terminal, the handover allowing the terminal to communicate wirelessly in the small cell, the measurement result being obtained by measuring a degree of interference between the terminal and one or more other terminals that communicate wirelessly in the macrocell, and a controller configured to control the handover based on the measurement result.

According to the present disclosure, there is provided a communication control method including communicating wirelessly with a terminal in a macrocell that is allowed to communicate wirelessly in FDD mode using a frequency band, the macrocell being overlapped in part or in whole with a small cell that is allowed to communicate wirelessly in TDD mode using the frequency band, acquiring a measurement result during handover of a terminal, the handover allowing the terminal to communicate wirelessly in the small cell, the measurement result being obtained by measuring a degree of interference between the terminal and one or more other terminals that communicate wirelessly in the macrocell, and controlling the handover based on the measurement result.

According to the present disclosure, there is provided a communication control device including an acquisition unit configured to acquire a measurement result during handover of a terminal in a small cell that is allowed to communicate wirelessly in TDD mode using a frequency band of a macrocell that is allowed to communicate wirelessly in FDD mode using the frequency band, the handover allowing the terminal to communicate wirelessly in the small cell, the small cell being overlapped in part or in whole with the macrocell, the measurement result being obtained by measuring a degree of interference between the terminal and one or more other terminals that communicate wirelessly in the macrocell, and a controller configured to control the handover based on the measurement result.

According to the present disclosure, there is provided a terminal including a wireless communication unit configured to communicate wirelessly with a base station of a macrocell in the macrocell that is allowed to communicate wirelessly in FDD mode using a frequency band and configured to communicate wirelessly with a base station of a small cell in the small cell, the macrocell being overlapped in part or in whole with the small cell that is allowed to communicate wirelessly in TDD mode using the frequency band, and a controller configured to perform control for measuring, during handover of the terminal, a degree of interference between the terminal and one or more other terminals that communicate wirelessly in the macrocell, the handover allowing the terminal to communicate wirelessly in the small cell. The handover is controlled based on a result of the measurement.

Advantageous Effects of Invention

According to the embodiments of the present disclosure as described above, it is possible to reduce the interference that may occur during handover in a heterogeneous network.

DESCRIPTION OF EMBODIMENTS

Figure 1:
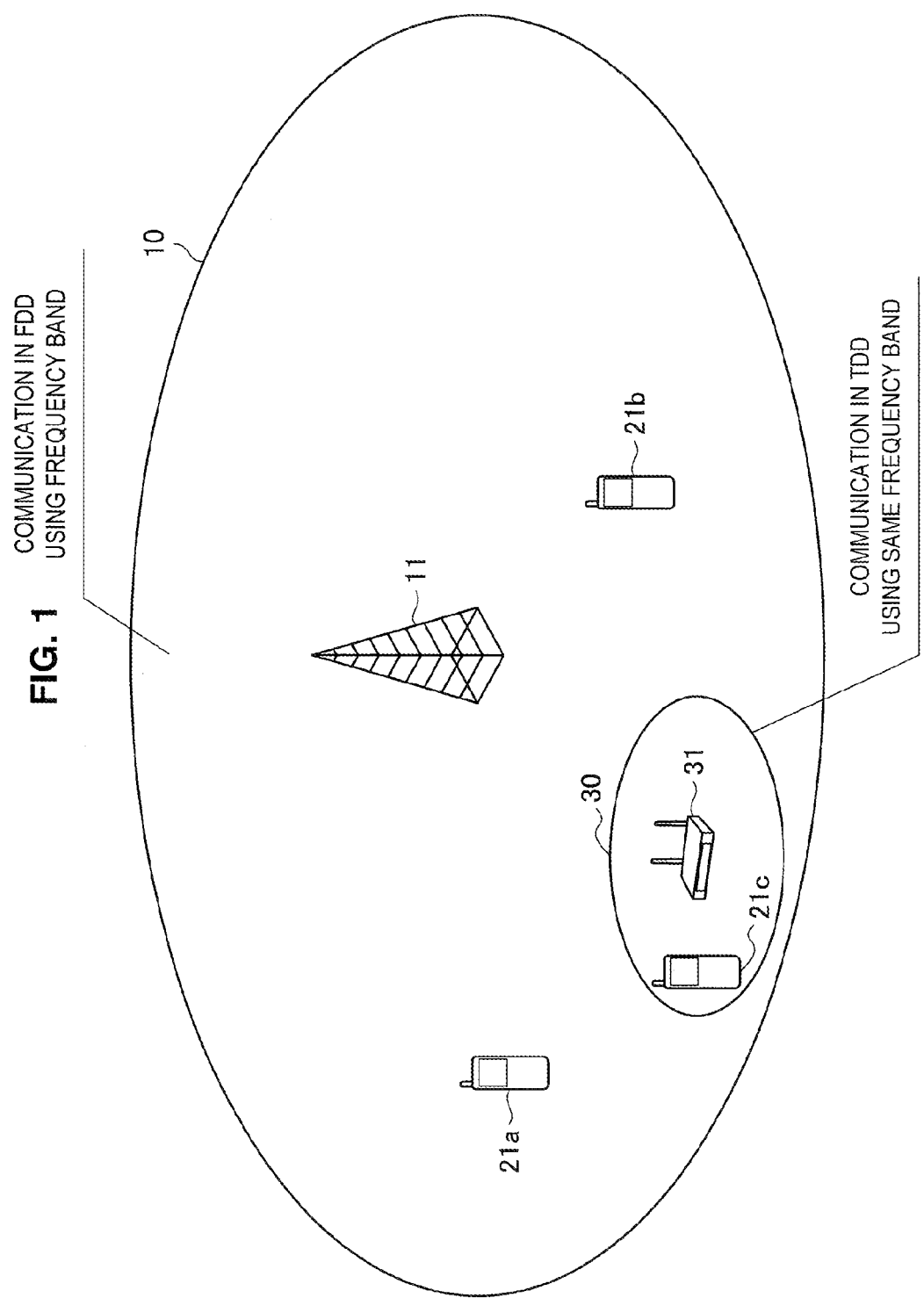
FIG. 1 is a diagram for describing an example of a network that is assumed to be heterogeneous.

Hereinafter, preferred embodiments of the present disclosure will be described in detail with reference to the appended drawings. Note that, in this specification and the drawings, elements that have substantially the same function and structure are denoted with the same reference signs, and repeated explanation is omitted.

The description is made in the following order.
1. Introduction
1.1. FDD and TDD in LTE
1.2. Network assumed to be heterogeneous
1.3. Interference in heterogeneous network
1.4. Technical problem
2. Exemplary configuration of wireless communication system
3. Overview of embodiment
4. Configuration of devices
4.1. Configuration of eNodeB
4.2. Configuration of UE
5. Process procedure
6. Modification
6.1. Overview
6.2. Configuration of eNodeB
6.3. Configuration of UE
6.4. Process procedure
7. Conclusion

<<1. INTRODUCTION>>

Figure 2:
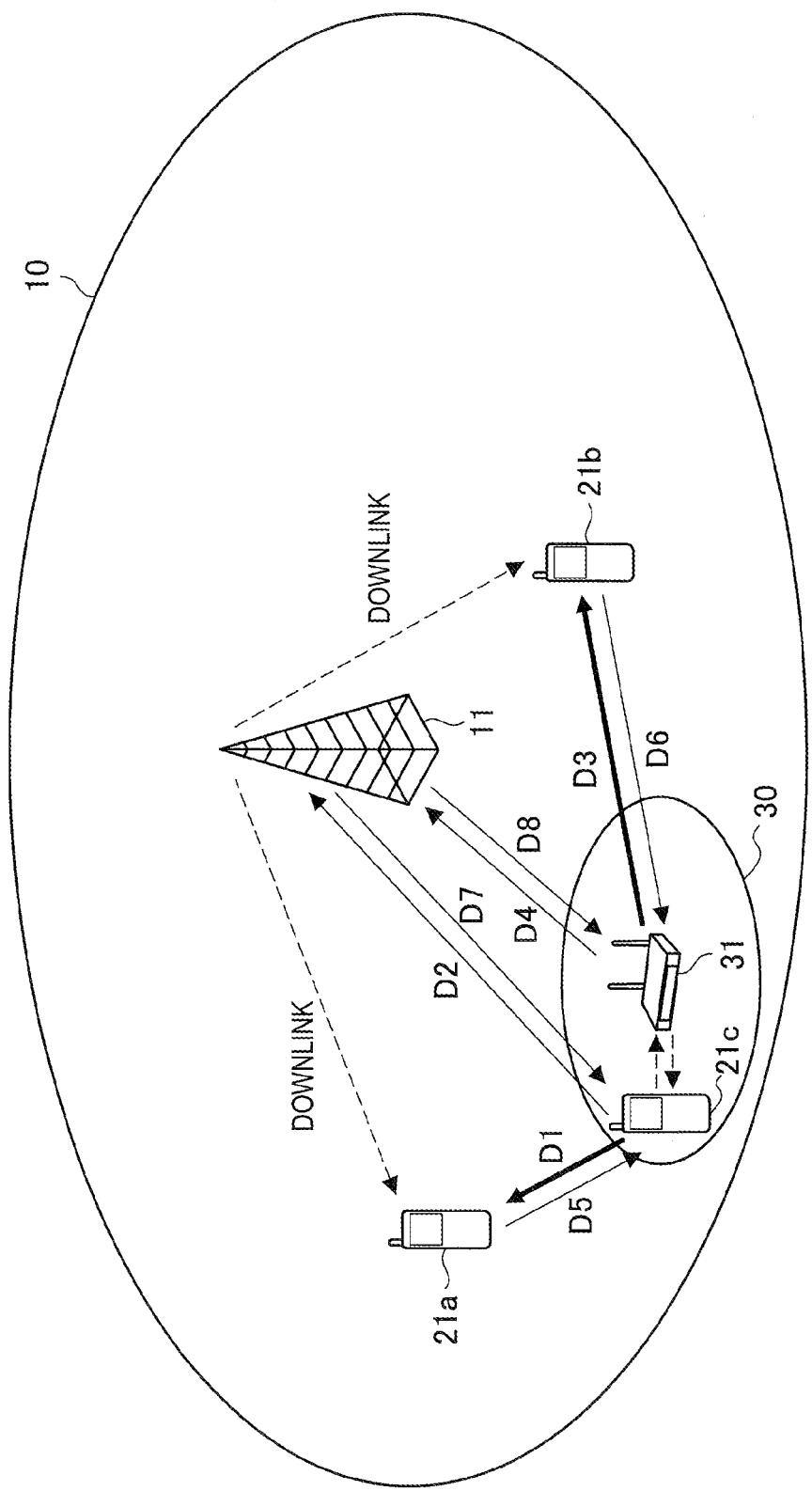
FIG. 2 is a diagram for describing an example of interference in a downlink frequency band in the heterogeneous network assumed.
Figure 3:
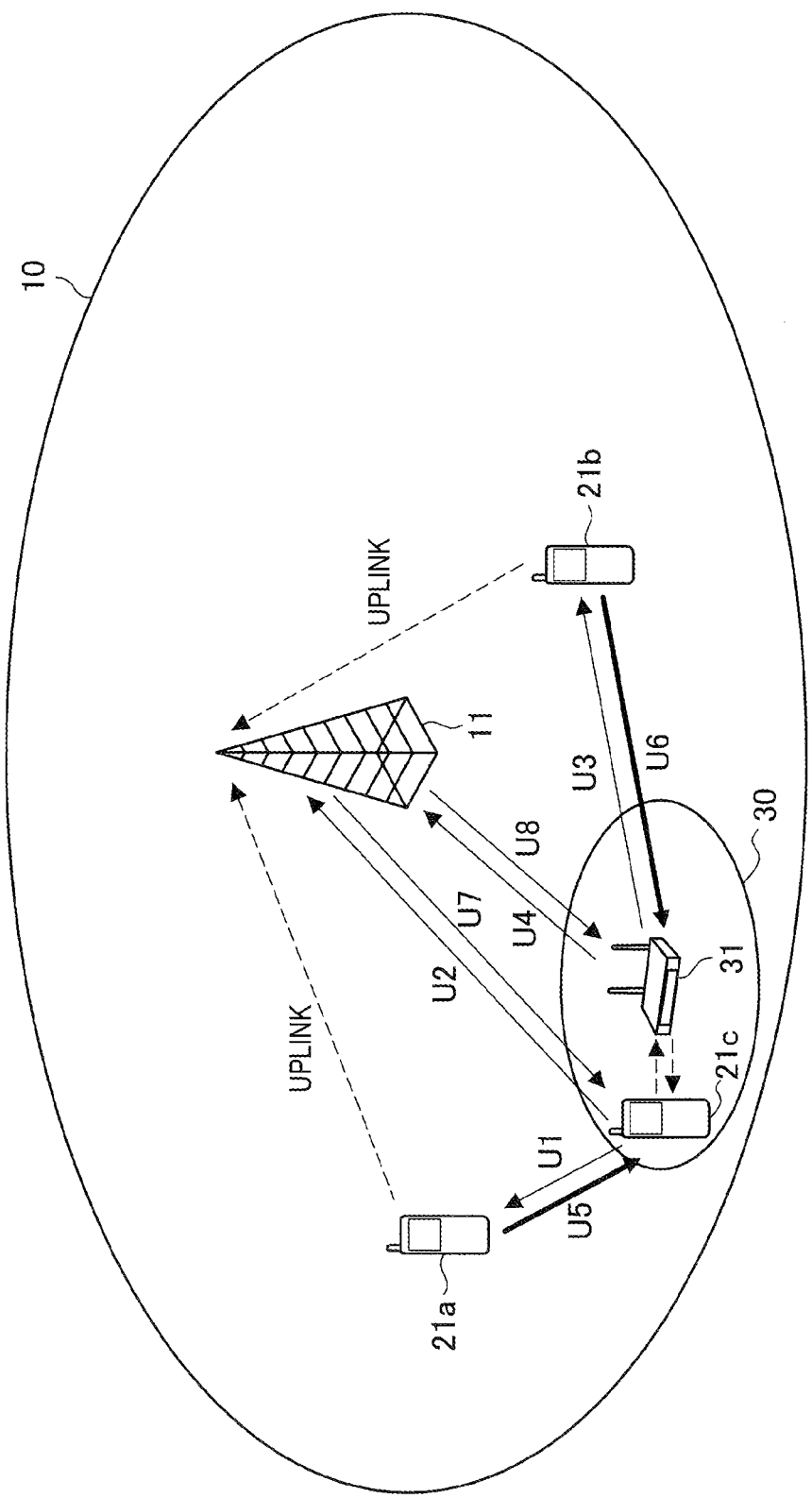
FIG. 3 is a diagram for describing an example of interference in an uplink frequency band in the heterogeneous network assumed.

Referring to FIGS. 1 to 3, FDD and TDD in LTE, a heterogeneous network assumed, interference in a heterogeneous network, and technical problems are described.

<1.1. FDD and TDD in LTE>

Frequency division duplex (FDD) and time division duplex (TDD) modes in LTE are described before the description of an embodiment of the present disclosure.

For a long-term evolution (LTE) system that is expected to be in widespread use around the world in the future, FDD mode and TDD mode are all standardized by 3GPP. In TDD mode, a single frequency is used for both the uplink and downlink transmissions on a time division basis. The TDD mode employs time division, and thus the maximum communication speed in the TDD mode is in principle lower than that in the FDD mode. However, the TDD mode has great advantages in terms of installation cost such as lower manufacturing cost of a terminal and a base station.

One of the advantages is that the TDD mode simplifies radio control and facilitates effective utilization of radio resources, resulting in a cost-effective operation of a wireless communication system.

Specifically, for example, the TDD mode uses the same frequency for uplink and downlink transmissions, and thus it is possible to execute radio control based on the channel reciprocity between uplink and downlink. For this reason, a base station can easily estimate a downlink wireless channel using an uplink wireless channel. Thus, the marked simplification of radio control between a base station and a terminal is achievable.

Furthermore, in the TDD mode, it is possible to change a channel configuration of uplink and downlink, that is, a combination of the directions of a link for each sub-frame included in a radio frame. Thus, the amount of radio resources in the uplink and downlink may be adjusted reciprocally in a flexible way depending on their respective actual traffic conditions.

As described above, the simplification of radio control and the facilitation of effective utilization of radio resources make it possible to achieve the cost-effective operation of a wireless communication system in the TDD mode.

Another one of the advantages is that the TDD mode can reduce the cost of manufacturing a terminal.

More specifically, for example, a TDD-based terminal may be configured without an expensive antenna duplexer that has a large installation area such as an antenna duplexer of an FDD-based terminal.

In addition, a TDD-based terminal is unable to perform the uplink and downlink communications simultaneously. Thus, in principle, there are little significant difficulties in designing a high-frequency circuit, such as deterioration in sensitivity caused by any interference to a circuit for receiving a transmission signal. However, such difficulties are regarded as a major consideration in designing a circuit of an FDD-based terminal. Accordingly, a high-frequency amplifier circuit of a TDD-based terminal can be installed at a lower cost than a high-frequency amplifier circuit of an FDD-based terminal.

As described above, in the TDD mode, the manufacturing costs of a terminal can be reduced in terms of antenna duplexer, high-frequency amplifier circuit, or the like.

According to the standard of each frequency band for an LTE system developed currently by the 3GPP, any one of FDD mode and TDD mode is assumed to be employed. Thus, mobile network operators of an LTE system employ any one of FDD mode and TDD mode depending on the usage of the LTE system. As the result, the FDD mode is more often employed under the current circumstances. However, for the reason described above, a TDD-based LTE system is also more likely to be in widespread use in the future.

<1.2. Network Assumed to be Heterogeneous>

A network that is assumed to be heterogeneous is now described with reference to FIG. 1 before the description of the present embodiment.

With the current widespread use of smartphones, the increase in data traffic in a cellular system becomes an issue. Thus, the increase in channel capacity in a cellular system is increasingly important for mobile network operators. Since it is conceivable that frequency resources might be exhausted in the future under such circumstances, there is a demand for more efficient utilization of the frequency resources in the cellular system. For example, the resolution adopted at world radiocommunication conference (WRC) that is the radio standardization conference held by ITU-R points out the necessity of a study on a new wireless communication technology such as the so-called cognitive radio.

In an example of effective utilization approaches of frequency resources to increase the channel capacity, a mobile network operator deploys a small cell such as picocell and femtocell within a macrocell. In other words, the mobile network operator employs a heterogeneous network (hereinafter referred to as "HetNet"). This enables the mobile network operator to achieve larger channel capacity through a cell-splitting gain.

Today, the LTE system employs either FDD mode or TDD mode as described above, but it is conceivable that, in the HetNet, for example, the FDD mode and TDD mode both are employed for the same frequency band under a given technical requirement. For example, the mobile network operator can employ the FDD mode for a macrocell and the TDD mode for a small cell. This point is now described in more detail with reference to FIG. 1.

FIG. 1 is a diagram for describing an example of HetNet that is assumed. Referring to FIG. 1, there are illustrated a macrocell 10 and eNodeB (hereinafter, referred to as "eNB") 11 in the macrocell 10. In addition, there are illustrated a small cell 30 and Home eNodeB (hereinafter, referred to as "HeNB") 31 in the small cell 30. The small cell 30 is overlapped in part or in whole with the macrocell 10. In other words, the macrocell 10 is overlapped in part or in whole with the small cell 30. Furthermore, there is illustrated a UE 21. The UE 21a and the UE 21b are located within the macrocell 30, but they are not located within the small cell 30. On the other hand, the UE 21c is located within the small cell.

Within the macrocell 10, wireless communication is performed in FDD mode. In other words, the eNB 11 communicates wirelessly with the UE 21a and the UE 21b within the macrocell 10 in FDD mode. More specifically, the eNB 11 sends a signal to the UE 21a and the UE 21b using a downlink frequency band, and receives a signal from the UE 21a and the UE 21b using an uplink frequency band.

On the other hand, within the small cell 30, wireless communication is performed in TDD mode using the same frequency band as a frequency band used by the eNB 11. In other words, the HeNB 31 communicates wirelessly with the UE 21c within the small cell 30 in TDD mode using an FDD frequency band. More specifically, the HeNB 31 sends a signal to the UE 21c using the aforementioned frequency band in a downlink sub-frame, and receives a signal from the UE 21c using the same frequency band in an uplink sub-frame.

In the aforementioned HetNet, for example, the macrocell 10 and the small cell 30 use the same frequency band, and they simultaneously use the frequency band.

Such a HetNet allows mobile network operators to achieve the increased system capacity at a lower cost. It is desirable to improve convenience of a user through the enhanced frequency utilization efficiency and cost reduction from the long-term perspective.

<1.3. Interference in Heterogeneous Network>

Subsequently, referring to FIGS. 2 and 3, interference in the above-mentioned HetNet assumed is described.

In the HetNet described above with reference to FIG. 1, that is, a case in which FDD-based wireless communication is performed in a macrocell and TDD-based wireless communication is performed in a small cell, a new type of interference, which is not assumed in HetNet in the past, may occur. For example, given the example of FIG. 1, the UE 21c, which communicates wirelessly within the small cell 30 (that is, UE 21c communicating wirelessly with the HeNB 31), communicates wirelessly in TDD mode using a downlink frequency band and/or an up frequency band for the macrocell 10. Thus, the UE 21c sends and receives a signal in a downlink frequency band. In addition, the UE 21c sends and receives a signal in an up frequency band. The interference in the HetNet assumed is described in more detail below, based on such wireless communication in the small cell 30.

FIG. 2 is a diagram for describing an example of interference in a downlink frequency band in the assumed heterogeneous network. In addition, FIG. 3 is a diagram for describing an example of interference in an uplink frequency band in the assumed heterogeneous network. Referring to FIGS. 2 and 3, similarly to FIG. 1, there are illustrated the macrocell 10, the eNB 11, the UE 21, the small cell 30, and the HeNB 31. As described above, FDD-based wireless communication is performed in the macrocell 10, and TDD-based wireless communication is performed in the small cell 30. In addition, the macrocell 10 and the small cell 30 simultaneously use the same frequency band.

Furthermore, referring to FIG. 2, a candidate for signal transmission in a downlink frequency band is represented using the arrow. This downlink frequency band is a frequency band used for downlink in the macrocell 10 that employs FDD mode. There are illustrated D1 to D8 which may be a source of interference among the candidates for signal transmission. In a downlink frequency band, signal transmissions from the eNB 11 to the UE 21a and the UE 21b are normal signal transmissions within the microcell 10, and signal transmissions between the HeNB 31 and the UE 21c are normal signal transmissions within the small cell 30.

The effect of interference on the signal transmissions D1 to D8 that may be a source of interference as described above is summarized as follows.

TABLE 1

| Signal transmission | Sending side (interfering side) | Receiving side (interfered side) | Effect |
| --- | --- | --- | --- |
| D1 | UE in small cell | UE in macrocell | Interference is large if UE in macrocell is close to UE in small cell |
| D2 | UE in small cell | eNB in macrocell | Interference is very small |

TABLE 1-continued

| Signal transmission | Sending side (interfering side) | Receiving side (interfered side) | Effect |
|---|---|---|---|
| D3 | HeNB in small cell | UE in macrocell | Interference is large if UE in macrocell is close to HeNB in small cell |
| D4 | HeNB in small cell | eNB in macrocell | Interference is very small |
| D5 | UE in macrocell | UE in small cell | No interference in principle |
| D6 | UE in macrocell | HeNB in small cell | No interference in principle |
| D7 | eNB in macrocell | UE in small cell | Interference occurs but avoidable by common technique |
| D8 | eNB in macrocell | HeNB in small cell | Interference occurs but avoidable by common technique |

Furthermore, referring to FIG. 3, a candidate for signal transmission in an uplink frequency band is represented using the arrow. This uplink frequency band is a frequency band used for uplink in the macrocell 10 that employs FDD mode. There are illustrated U1 to U8 which may be a source of interference among the candidates for signal transmission. In an uplink frequency band, signal transmissions from the UE 21a and the UE 21b to the eNB 11 are normal signal transmissions within the microcell 10, and signal transmissions between the HeNB 31 and the UE 21c are normal signal transmissions within the small cell 30.

The effect of interference on the signal transmissions D1 to D8 that may be a source of interference as described above is summarized as follows.

TABLE 2

| Signal transmission | Sending side (interfering side) | Receiving side (interfered side) | Effect |
|---|---|---|---|
| U1 | UE in small cell | UE in macrocell | Interference is small |
| U2 | UE in small cell | eNB in macrocell | Interference is very small |
| U3 | HeNB in small cell | UE in macrocell | Interference is small |
| U4 | HeNB in small cell | eNB in macrocell | Interference is very small |
| U5 | UE in macrocell | UE in small cell | Interference is large if macro terminal is close to UE in small cell |
| U6 | UE in macrocell | HeNB in small cell | Interference is large if macro terminal is close to HeNB in small cell |
| U7 | eNB in macrocell | UE in small cell | No interference in principle |
| U8 | eNB in macrocell | HeNB in small cell | No interference in principle |

In the past, for example, when both the macrocell 10 and the small cell 30 perform wireless communication in FDD mode, the transmission power of the eNodeB 11 of the microcell 10 is large, and thus the interference caused by the signal transmissions D7 and D8 in a downlink frequency band is a significant issue. In order to mitigate such interference, a technique is used to reduce interference from the eNodeB 11 to the small cell 30 by preventing the eNodeB 11 from transmitting for a given period of time. This technique allows a significant signal (for example, a control signal) in the small cell 30 to be protected from the signal transmitted from the eNodeB 11.

Furthermore, in the past, when the microcell 10 performs wireless communication in FDD mode and the small cell 30 performs wireless communication in TDD mode, the same frequency band is not used simultaneously. In other words, the small cell 30 uses a frequency band different from that used in the macrocell 30. The discrimination of signals by a high frequency filter circuit can prevent interference between frequency bands from occurring in the macrocell 10 and the small cell 30.

On the other hand, like the HetNet assumed as described above, when the macrocell 10 that communicates wirelessly in FDD mode and the small cell 30 that communicates wirelessly in TDD mode both use the same frequency band simultaneously, occurrence of another possible interference may be a problem. In other words, as shown in Tables 1 and 2, the interference (interference caused by signal transmissions D1, D3, U5, and U6) between a device (UE 21c and HeNB 31) within the small cell 30 and the UEs 21a and 21b within the macrocell 10 is a major problem. In this way, a new interference different from any interference in the past may occur in the HetNet assumed.

The signal transmissions D5 and D6 do not cause interference in principle because there are no signal transmissions D5 and D6 in the downlink frequency band. Similarly, the signal transmissions U7 and U8 do not cause interference in principle because there are no signal transmissions U7 and U8 in the uplink frequency band. Considering a small transmission power of the UE 21c and the HeNB 31 that communicate wirelessly in the small cell 30 and the distance between the eNodeB 11 and the small cell 30, the interference caused by the signal transmissions D2, D4, U2, and U4 is very small. In addition, considering that the UE 21c and the HeNB 31 use a small transmission power to communicate wirelessly in the small cell 30, the interference caused by the signal transmission U1 and U3 is small.

<1.4. Technical Problem>

Technical problems present in the HetNet assumed are described.

As described above, interference occurs in HetNet. Thus, a technique for reducing the interference in HetNet is studied. For example, JP 2011-211369A discloses a technology that reduces interference by adjusting appropriately the transmission power of terminals and a base station using a cooperation manager when the frequency band is shared between a small cell and a macrocell in HetNet.

However, Patent Literature 1 considers interference during normal communication in HetNet, but interference that may occur in such a particular case of executing handover by a terminal in HetNet is not considered. Thus, interference may occur between a macrocell and a small cell, for example, during handover of a terminal, even when the invention disclosed in Patent Literature 1 is used. The interference occurred during the handover is described in detail.

(Interference Caused by Handover Between Cells) The interference caused by handover between cells in the HetNet assumed is first described. In the HetNet assumed, especially, the interference caused by inter-cell handover from a macrocell to a small cell becomes a problem. The interference caused during handover is described in detail.

Handover in Downlink Frequency Band

The signal transmission from a target UE of handover to a UE located in close proximity to the small cell among UEs in the macrocell may cause interference during the handover in a downlink frequency band.

More specifically, referring again to FIG. 2, during handover of the UE 21 from the macrocell 10 to the small cell 30, a UE 21 that is a target of handover performs random access as an initial procedure. In this random access, the UE 21 first sends a particular signal, called a preamble signal, to a base station of a target cell on a random access channel (hereinafter, referred to as "RACH"). In other words, the UE 21 sends the preamble signal to the HeNB 31 within the small cell 30. The power for preamble signal output is typically decided based on path loss from the HeNB 31 that is assumed in a downlink channel of the UE 21. If the UE 21 performs random access in a usual way during the handover, the power for preamble signal output from the UE 21 may be excessively large. If such random access is performed using a downlink frequency band, the transmission of the preamble signal corresponds to the signal transmission D1 shown in FIG. 2. Accordingly, interference may occur between a UE 21 located near the small cell 30 among UEs 21 within the macrocell 10 and a target UE 21 of handover.

Handover in Uplink Frequency Band

When the aforementioned handover is performed in an uplink frequency band, the signal transmission from a UE located near the small cell among UEs within the macrocell to a target UE of handover may cause interference.

More specifically, referring again to FIG. 3, after the handover from the macrocell 10 to the small cell 30 in the uplink frequency band, a target UE 21 of handover is allowed to send and receive a signal in the uplink frequency band. Thus, after the handover is performed, if a UE 21 communicating wirelessly in the macrocell 10 is located near the small cell 30, then interference may be caused by the signal transmission from the UE 21 to a target UE 21 of handover (corresponding to the signal transmission U5 shown in FIG. 3).

As described above, during inter-cell handover from a macrocell to a small cell, interference may occur in each of the downlink and uplink frequency bands.

(Interference During Handover Between Frequencies)

The interference occurred during inter-frequency handover in the HetNet assumed is described. In the HetNet assumed, especially, interference that may be occurred during inter-frequency handover in a small cell is a problem. The interference occurred during the handover is described in detail.

Handover to Downlink Frequency Band

During the handover to a downlink frequency band, the signal transmission from a target UE of handover to a UE located near a small cell among UEs in a macrocell may cause interference. Specifically, this interference is similar to the interference caused by the inter-cell handover from a macrocell to a small cell in the downlink frequency band. In other words, for the handover to a downlink frequency band in a small cell, random access is performed in the downlink frequency band, and thus interference similar to the aforementioned inter-cell interference may occur.

Handover to Uplink Frequency Band

During the handover to an uplink frequency band, interference may be caused by the signal transmission from a UE located near a small cell among UEs within a macrocell to a target UE of handover. Specifically, this interference is similar to the interference caused by the inter-cell handover from a macrocell to a small cell in an uplink frequency band. In other words, for the handover to an uplink frequency band in a small cell, after the handover is completed, if a UE 21 communicating wirelessly in the macrocell 10 is located near the small cell 30, then interference may be caused by the signal transmission from the UE 21 to a target UE 21 of handover.

As described above, during the inter-frequency handover in a small cell, interference may occur in each of the downlink and uplink frequency bands.

The present embodiment can reduce the interference caused during handover in a heterogeneous network. In the following, <2. Exemplary configuration of wireless communication system>, <3. Overview of embodiment>, <4. Configuration of devices>, <5. Process procedure>, and <6. Modification> are described in detail.

<<2. Exemplary Configuration of Wireless Communication System>>

Figure 4:
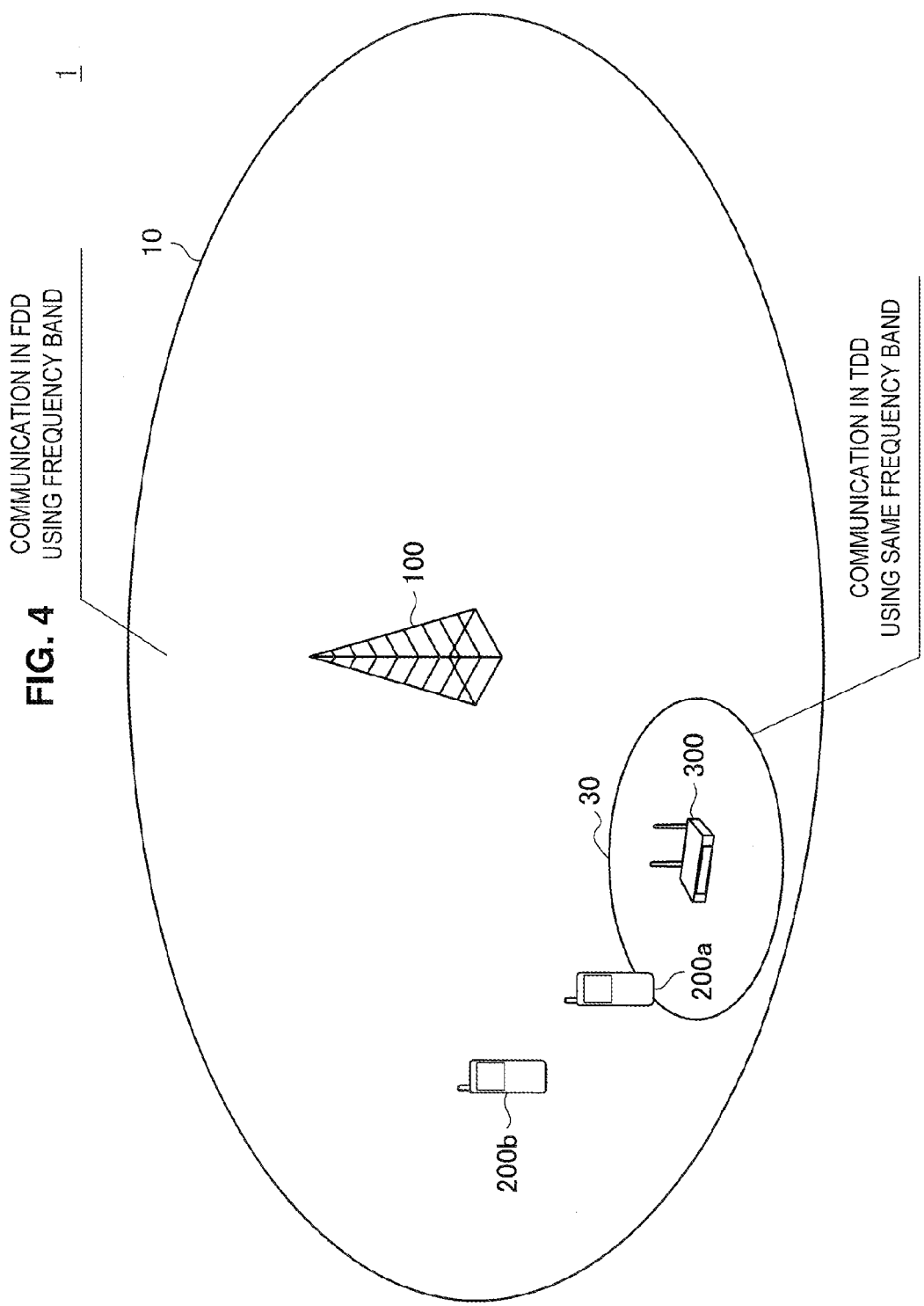
FIG. 4 is a schematic diagram for describing an exemplary configuration of a wireless communication system according to an embodiment.

An exemplary configuration of a wireless communication system according to an embodiment of the present disclosure is described with reference to FIG. 4. FIG. 4 is a schematic diagram for describing an exemplary configuration of a wireless communication system 1 according to the present embodiment. Referring to FIG. 4, the wireless communication system 1 includes an eNB 100 and a UE 200 within the macrocell 10 and includes a HeNB 300 within the small cell 30. The target UE 200a of handover and the UE 200b are UEs that performs wireless communication within the macrocell 10 (more strictly, a region except for the small cell 30 in the macrocell 10).

The wireless communication system 1 performs wireless communication in a similar way to that in the HetNet assumed as described with reference to FIG. 1.

More specifically, the wireless communication in the macrocell 10 is performed in FDD mode using a frequency band. In other words, the eNB 100 communicates wirelessly with the UE 200 within the macrocell 10 in FDD mode using a frequency band. More specifically, the eNB 100 sends a signal to the UE 200 using a downlink frequency band and receives a signal from the UE 200 using an uplink frequency band.

On the other hand, the wireless communication in the small cell 30 is performed in TDD mode using the same frequency band as the frequency band used by the eNB 100. In other words, the HeNB 300 communicates wirelessly with the UE 200 within the small cell 30 in TDD mode using the aforementioned frequency band. More specifically, the HeNB 300 sends a signal to the UE 200 in a downlink sub-frame using the aforementioned frequency band and receives a signal from the UE 200 in an uplink sub-frame using the aforementioned frequency band.

In the wireless communication system 1, the same frequency band is used in both the macrocell 10 and the small cell 30, and this frequency band is used simultaneously.

<<3. Overview of Embodiment>>

An overview of the present embodiment is described with reference to FIGS. 5 and 6. In the present embodiment, during handover of the UE 200a that allows the UE 200a to communicate wirelessly in the small cell 30, the degree of interference between the UE 200a and one or more other UEs 200 (for example, UE 200b) that communicate wirelessly in the macrocell 10 is measured. Then, the eNB 100 executes the handover based on a measurement result obtained by measuring the interference. The handover of the UE 200a that allows the UE 200a to communicate wirelessly in the small cell 30 is inter-cell handover from the macrocell 10 to the small cell 30 or inter-frequency handover within the small cell 30. Such an overview of the present embodiment is described by taking an example of the inter-cell handover from the macrocell 10 to the small cell 30.

(Downlink Frequency Band)

Figure 5:
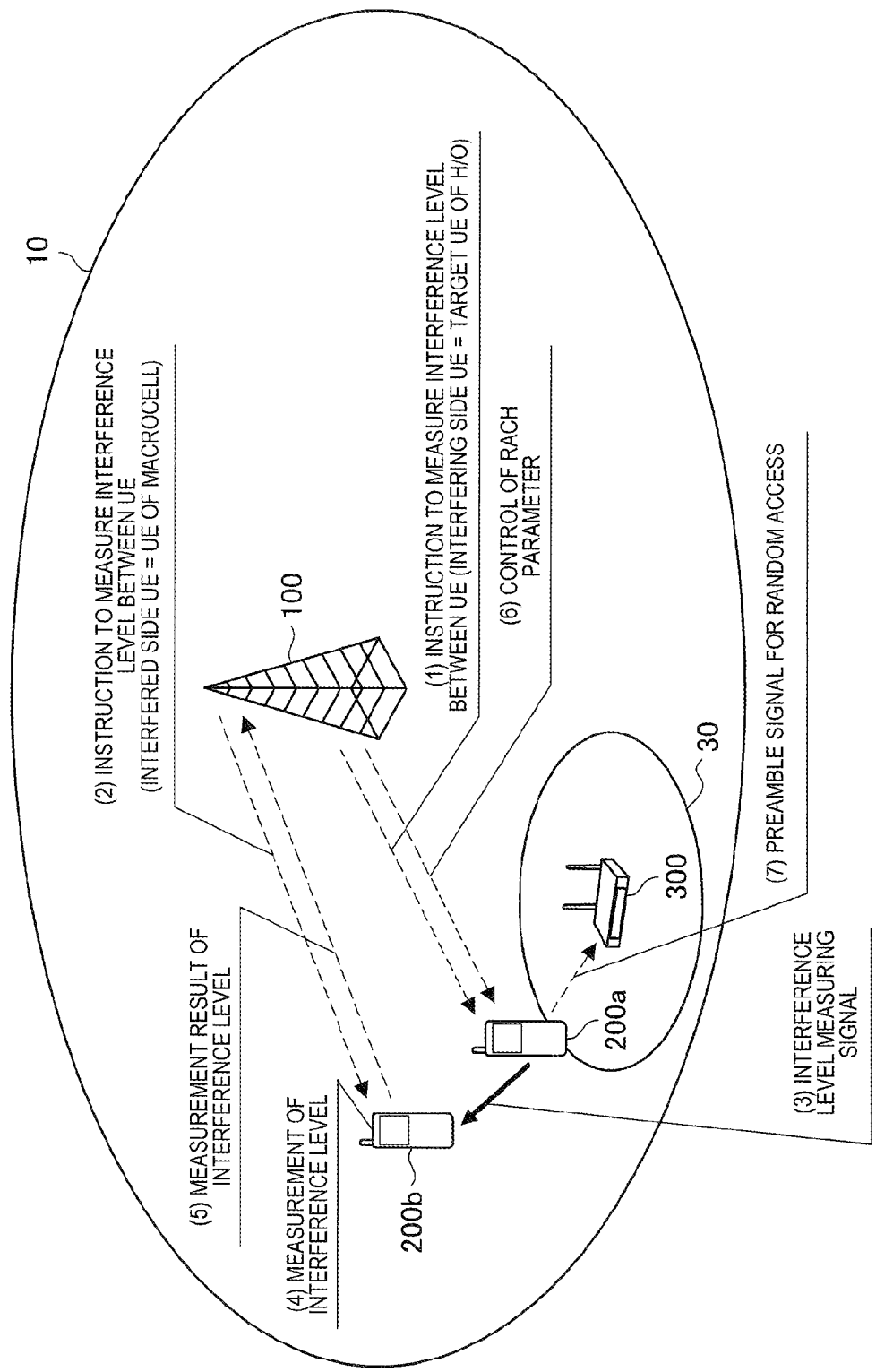
FIG. 5 is a diagram for describing an overview of the operation of a wireless communication system according to an embodiment with respect to a downlink frequency band.

Referring now to FIG. 5, an overview of the operation of the wireless communication system 1 with respect to the inter-cell handover from the macrocell 10 to the small cell 30 in a downlink frequency band is described. FIG. 5 is a diagram for describing an overview of the operation of the wireless communication system 1 with respect to the downlink frequency band. Referring to FIG. 5, the operation of the wireless communication system 1 with respect to the downlink frequency band is described by the following procedure of (1) to (7).

(1) The eNB 100 instructs a target UE 200a of handover to measure the degree of interference (hereinafter, referred to as "interference level") between the UE 200a and one or more other UEs 200.

(2) The eNB 100 instructs the one or more other UEs 200 (for example, UE 200b) communicating wirelessly in the macrocell 10 to measure the interference level between the UE 200a and the one or more other UEs 200.

(3) The Target UE 200a of handover sends a signal for measuring the interference level (hereinafter, referred to as "interference level measuring signal").

(4) Each of the one or more other UEs 200 (for example, UE 200b) receives the interference level measuring signal and measures the interference level between the UE 200a and the other UE in a downlink frequency band.

(5) Each of the one or more other UEs 200 (for example, UE 200b) sends a measurement result obtained by measuring the interference level to the eNB 100.

(6) The eNB 100 controls a parameter related to the RACH of the UE 200a based on the measurement result. More specifically, for example, the eNB 100 decides the transmission power on the RACH of the UE 200a so as not to cause interference from the UE 200a to the one or more other UEs 200 (for example, UE 200b) based on the measurement result. The eNB 100 then reports the decided transmission power to the UE 200a.

(7) The UE 200a sets the received parameter (for example, transmission power on the RACH) and then sends a preamble signal for random access to the HeNB 300.

The wireless communication system 1 according to the present embodiment operates, for example, like the procedure of (1) to (7). The measurement result makes it possible to predict the degree of interference that occurs in signal transmission from the target UE 200a of handover to the one or more other UEs 200 located near the small cell 30. The interference can be reduced by changing the RACH-related parameter of the UE 200a (for example, transmission power on the RACH) based on the measurement result. For example, if it is determined, based on the measurement result, that the interference level is high, the interference can be reduced by decreasing the transmission power of the UE 200a on the RACH. In this way, it is possible to reduce the interference occurred during the inter-cell handover from the macrocell 10 to the small cell 30 in a downlink frequency band.

The overview of the operation of the wireless communication system 1 with respect to the inter-cell handover from the macrocell 10 to the small cell 30 in the downlink frequency band has been described above. The operation can be similarly applicable to the inter-frequency handover to a downlink frequency band in the small cell 30.

(Uplink Frequency Band)

Figure 6:
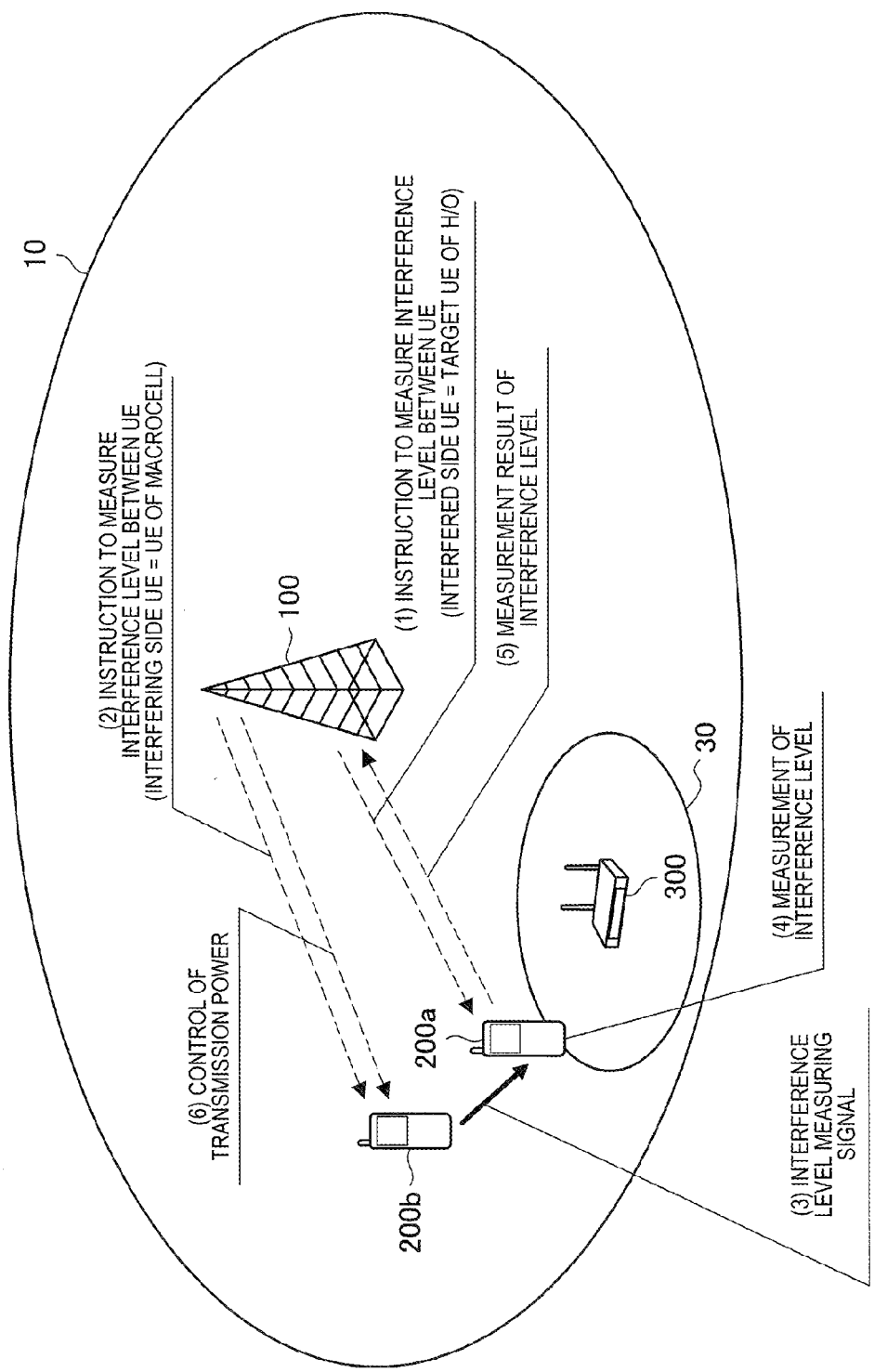
FIG. 6 is a diagram for describing an overview of the operation of a wireless communication system according to an embodiment with respect to an uplink frequency band.

Referring now to FIG. 6, an overview of the operation of the wireless communication system 1 with respect to the inter-cell handover from the macrocell 10 to the small cell 30 in an uplink frequency band is described. FIG. 6 is a diagram for describing an overview of the operation of the wireless communication system 1 with respect to an uplink frequency band. Referring to FIG. 6, the operation of the wireless communication system 1 with respect to the uplink frequency band is described by the following procedure of (1) to (6).

(1) The eNB 100 instructs a target UE 200a of handover to measure the degree of interference (hereinafter, referred to as "interference level") between the UE 200a and one or more other UEs 200.

(2) The eNB 100 instructs the one or more other UEs 200 (for example, UE 200b) communicating wirelessly in the macrocell 10 to measure the interference level between the UE 200a and the one or more other UEs 200.

(3) Each of the one or more other UEs 200 (for example, UE 200b) sends a signal for measuring the interference level (hereinafter, referred to as "interference level measuring signal").

(4) The Target UE 200a of handover receives the interference level measuring signal and measures the interference level between the UE 200a and each of the one or more other UEs 200 (for example, UE 200b) in an uplink frequency band.

(5) The target UE 200a of handover sends a measurement result obtained by measuring the interference level to the eNB 100.

(6) The eNB 100 controls a transmission power of the one or more other UEs 200 (for example, UE 200b) based on the measurement result. More specifically, for example, the eNB 100 decides the transmission power of the one or more other UEs 200 so as not to cause interference from the one or more other UEs 200 (for example, UE 200b) to the UE 200a based on the measurement result. The eNB 100 then reports the decided transmission power to the one or more other UEs 200.

The wireless communication system 1 according to the present embodiment operates, for example, like the procedure of (1) to (6). The measurement result makes it possible to predict the degree of interference that occurs in signal transmission from the one or more other UEs 200 located near the small cell 30 to the UE 200*a*. This interference can be reduced by changing the transmission power of the one or more other UEs 200 based on the measurement result. For example, if it is determined, based on the measurement result, that the interference level is high, the interference can be reduced by decreasing the transmission power of UE 200 that is related to the interference from among the one or more other UEs 200. In this way, it is possible to reduce the interference occurred during the inter-cell handover from the macrocell 10 to the small cell 30 in an uplink frequency band.

The overview of the operation of the wireless communication system 1 with respect to the inter-cell handover from the macrocell 10 to the small cell 30 in the uplink frequency band has been described above. The operation can be similarly applicable to the inter-frequency handover to an uplink frequency band in the small cell 30.

<<4. Configuration of Devices>>

Figure 7:
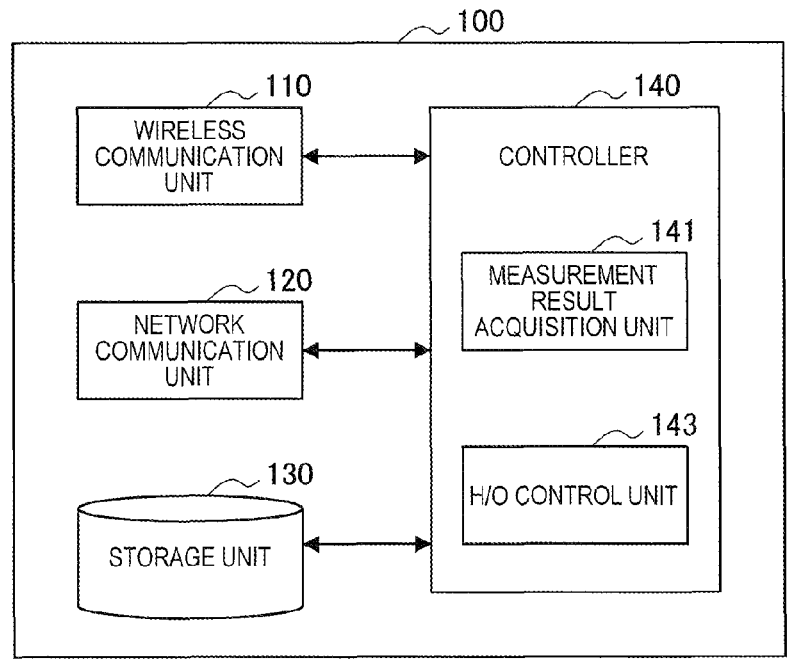
FIG. 7 is a block diagram illustrating an exemplary configuration of eNodeB according to an embodiment.
Figure 8:
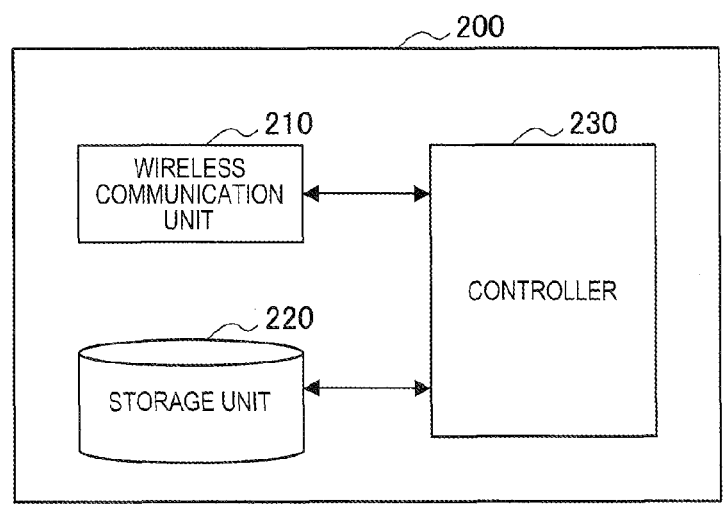
FIG. 8 is a block diagram illustrating an exemplary configuration of UE according to an embodiment.

The configuration of the eNodeB 100 and the UE 200 is described with reference to FIGS. 7 and 8.

<4.1. Configuration of eNodeB>

An exemplary configuration of the eNB 100 according to the present embodiment is described with reference to FIG. 7. FIG. 7 is a block diagram illustrating an exemplary configuration of the eNB 100 according to the present embodiment. Referring to FIG. 7, the eNB 100 is configured to include a wireless communication unit 110, a network communication unit 120, a storage unit 130, and a controller 140.

(Wireless Communication Unit 110)

The wireless communication unit 110 communicates wirelessly with the UE 200 in the macrocell 10. In addition, the wireless communication in the macrocell 10 is performed in FDD mode using a frequency band. In other words, the wireless communication unit 110 communicates wirelessly with the UE 200 within the macrocell 10 in FDD mode using a frequency band. More specifically, the wireless communication unit 110 sends a signal to the UE 200 within the macrocell 10 using a downlink frequency band. In addition, the wireless communication unit 110 receives a signal from the UE 200 within the macrocell 10 using an uplink frequency band.

The macrocell 10 is overlapped in part or in whole with the small cell 30. In other words, the small cell 30 is overlapped in part or in whole with the macrocell. The wireless communication in the small cell 30 is performed in TDD mode using the aforementioned frequency band.

The wireless communication unit 110 includes, for example, an antenna and an RF circuit.

(Network Communication Unit 120)

The network communication unit 120 communicates with another communication node. For example, the network communication unit 120 communicates with the HeNB 300 directly or through any other communication nodes.

(Storage Unit 130)

The storage unit 130 stores programs and data used for operation of the eNB 100. The storage unit 130 includes a storage medium such as a hard disk or a semiconductor memory.

(Controller 140)

The controller 140 allows the eNB 100 to perform various functions. For example, the controller 140 may be a processor such as CPU and DSP, and executes programs stored in the storage unit 130 or other storage media to perform various functions described above. The controller 140 includes a measurement result acquisition unit 141 and a handover control unit 143 (hereinafter, referred to as "H/O control unit 143").

(Measurement Result Acquisition Unit 141)

During handover of UE 200 that allows the UE 200 to communicate wirelessly in the small cell 30, the measurement result acquisition unit 141 acquires a measurement result obtained by measuring the degree of interference between the UE 200 and one or more other UEs 200 that communicate wirelessly in the macrocell 10. The phrase "communicate wirelessly in the macrocell 10" as used herein may be considered as synonymous with the phrase "communicate wirelessly with the eNB 100 within the macrocell 10".

For example, the aforementioned handover is handover that allows the UE 200 to communicate wirelessly in the small cell 30 using the downlink frequency band of the macrocell 10. More specifically, for example, the handover includes inter-cell handover of the UE 200 from the macrocell 10 to the small cell 30 in the downlink frequency band. In addition, the handover includes inter-frequency handover of the UE 200 to the downlink frequency band of the macrocell 10 in the small cell 30.

In this case, for example, during the aforementioned handover, the measurement result acquisition unit 141 gives an instruction for the target UE 200*a* of handover and the one or more other UEs 200 to measure the interference level between the UE 200*a* and the one or more other UEs 200 through the wireless communication unit 110. More specifically, the measurement result acquisition unit 141 instructs the target UE 200*a* of handover to send an interference level measuring signal. The interference level measuring signal may be a reference signal. In addition, the measurement result acquisition unit 141 receives the interference level measuring signal and instructs the one or more other UEs 200 to measure the interference level. The measurement of interference level may be measurement of reference signal received power (RSRP). Then, if the wireless communication unit 110 receives the measurement result of interference level from each of the one or more other UEs 200, the measurement result acquisition unit 141 acquires the measurement result.

Furthermore, for example, the aforementioned handover is handover that allows the UE 200 to communicate wirelessly in the small cell 30 using the uplink frequency band of the macrocell 10. More specifically, for example, the handover includes inter-cell handover of UE 200 from the macrocell 10 to the small cell 30 in the uplink frequency band. In addition, the handover includes inter-frequency handover of UE 200 to the uplink frequency band of the macrocell 10 in the small cell 30.

In this case, for example, during the aforementioned handover, the measurement result acquisition unit 141 gives an instruction for the target UE 200*a* of handover and the one or more other UEs 200 to measure the interference level between the UE 200*a* and the one or more other UEs 200 through the wireless communication unit 110. More specifically, the measurement result acquisition unit 141 instructs the one or more other UEs 200 to send an interference level measuring signal (for example, a reference signal). In addition, the measurement result acquisition unit 141 receives the interference level measuring signal and instructs the target UE 200a of handover to measure the interference level (for example, RSRP). Then, if the wireless communication unit 110 receives a measurement result obtained by measuring the interference level from the UE 200a, the measurement result acquisition unit 141 acquires the measurement result.

The measurement result acquisition unit 141 acquires the measurement result as described above.

For example, the measurement result acquisition unit 141 instructs a UE 200 located near the small cell 30 among the one or more other UEs 200, but not all of the one or more other UEs 200 that communicate wirelessly in the macrocell 10, to measure the interference level. The UE 200 located near the small cell 30 may be, for example, a UE 200 that sends a message of proximity indication.

In addition, for example, if there is no UE 200 located near the small cell 30 among the one or more other UEs 200, the interference level measurement process is omitted. In other words, the measurement result acquisition unit 141 does not acquire a measurement result. As an example, if there is no UE 200 that has sent a message of proximity indication, the measurement result acquisition unit 141 will neither instruct to measure the interference level and nor acquire the measurement result.

Such limitation on the acquisition of measurement result allows the UEs 200 related to the measurement to be narrowed down to UE 200 that causes the high level of interference or UE 200 that is damaged by the high level of interference. Thus, it is possible to reduce the high level of interference and mitigate the load that is necessary for measurement in the wireless communication system 1.

Furthermore, the measurement of interference level, that is, the transmission and reception of an interference level measuring signal may be implemented through the use of almost blank subframes (ABS). The measurement using ABS makes it possible to measure the interference level more accurately.

(H/O Control Unit 143)

The H/O control unit 143 controls the handover of UE 200 that allows the UE 200 to communicate wirelessly in the small cell 30, based on the measurement result obtained by the measurement result acquisition unit 141.

For example, the aforementioned handover is handover that allows the UE 200 to communicate wirelessly in the small cell 30 using the downlink frequency band of the macrocell 10. In this case, the H/O control unit 143 controls a parameter related to RACH of the target UE 200 of handover based on the measurement result. The parameter is a transmission power of the UE 200 on the RACH.

More specifically, for example, the H/O control unit 143 decides a transmission power of the UE 200a on the RACH so as not to cause interference from the UE 200a to the one or more other UEs 200 (for example, UE 200b) based on the measurement result. As an example, if it is determined that the interference level is high (for example, RSRP is larger than a predetermined threshold) based on the measurement result (for example, RSRP), the H/O control unit 143 further reduces the transmission power of the UE 200a on the RACH. On the other hand, if it is determined that the interference level is low (for example, RSRP is less than or equal to the predetermined threshold) based on the measurement result (for example, RSRP), the H/O control unit 143 maintains the transmission power of the UE 200a on the RACH. Then, the H/O control unit 143 reports the decided transmission power to the UE 200a through the wireless communication unit 110.

Furthermore, for example, the aforementioned handover is handover that allows the UE 200 to communicate wirelessly in the small cell 30 using the uplink frequency band of the macrocell 10. In this case, the H/O control unit 143 controls the transmission power of the one or more other UEs 200 in the uplink frequency band based on the measurement result.

More specifically, for example, the H/O control unit 143 decides the transmission power of the one or more other UEs 200 in the uplink frequency band so as not to cause the interference from the one or more other UEs 200 (for example, UE 200b) to the UE 200a, based on the measurement result. As an example, if it is determined that the interference level is high (for example, RSRP is larger than a predetermined threshold) based on the measurement result (for example, RSRP), then the H/O control unit 143 decreases the transmission power in the uplink frequency band of a UE 200 that is related to the interference among the one or more other UEs 200. On the other hand, if it is determined that the interference level is low (for example, RSRP is less than or equal to the predetermined threshold) based on the measurement result (for example, RSRP), the H/O control unit 143 maintains the transmission power in the uplink frequency band of UE 200 that is related to the interference among the one or more other UEs 200. Then, the H/O control unit 143 reports the decided transmission power to each of the one or more other UEs 200 through the wireless communication unit 110.

<4.2. Configuration of UE>

An exemplary configuration of the UE 200 according to the present embodiment is described with reference to FIG. 8. FIG. 8 is a block diagram illustrating an exemplary configuration of the UE 200 according to the present embodiment. Referring to FIG. 8, the UE 200 is configured to include a wireless communication unit 210, a storage unit 220, and a controller 230.

(Wireless Communication Unit 210)

In the macrocell 10, the wireless communication unit 210 communicates wirelessly with the eNB 100 of the macrocell 10. In addition, the wireless communication in the macrocell 10 is performed in FDD mode using a frequency band. In other words, the wireless communication unit 210 communicates wirelessly with the eNB 100 of the macrocell 10 in FDD mode using a frequency band. More specifically, the wireless communication unit 210 receives a signal from the eNB 100 of the macrocell 10 using a downlink frequency band. In addition, the wireless communication unit 210 sends a signal to the eNB 100 of the macrocell 10 using an uplink frequency band.

Furthermore, in the small cell 30, the wireless communication unit 210 communicates wirelessly with the HeNB 300 of the small cell 30. In addition, the wireless communication in the small cell 30 is performed in TDD mode using the aforementioned frequency band. In other words, the wireless communication unit 210 communicates wirelessly with the HeNB 300 of the small cell 30 in a TDD mode using a frequency band. More specifically, the wireless communication unit 210 receives a signal from the HeNB 300 of the small cell 30 in downlink subframes. In addition, the wireless communication unit 210 sends a signal to the HeNB 300 of the small cell 30 in uplink subframes.

The macrocell 10 is overlapped in part or in whole with the small cell 30. In other words, the small cell 30 is overlapped in part or in whole with the macrocell.

(Storage Unit 220)

The storage unit 220 stores programs and data used for operation of the UE 200. The storage unit 220 includes a storage medium such as a hard disk or a semiconductor memory.

(Controller 230)

The controller 230 allows the UE 200 to perform various functions. For example, the controller 230 may be a processor such as CPU and DSP, and executes programs stored in the storage unit 220 or other storage media to perform various functions described above.

Measurement Control During Handover of UE 200

For example, during the handover of UE 200 that allows the UE 200 to communicate wirelessly in the small cell 30, the controller 230 performs control for measuring the degree of interference between the aforementioned UE 200 and one or more other UEs 200 that communicate wirelessly in the macrocell 10.

For example, the aforementioned handover is handover that allows the UE 200 to communicate wirelessly in the small cell 30 using the downlink frequency band of the macrocell 10. In this case, for example, during the aforementioned handover, the controller 230 is instructed to measure the interference level between the UE 200 and the one or more other UEs 200 by the eNB 100 through the wireless communication unit 210. Then, the controller 230 causes the wireless communication unit 210 to send an interference level measuring signal (for example, a reference signal).

Furthermore, for example, the aforementioned handover is handover that allows the UE 200 to communicate wirelessly in the small cell 30 using an uplink frequency band of the macrocell 10. In this case, for example, during the aforementioned handover, the controller 230 is instructed to measure the interference level between the UE 200 and the one or more other UEs 200 by the eNB 100 through the wireless communication unit 210. Then, the controller 230 causes the wireless communication unit 210 to receive the interference level measuring signal (for example, a reference signal) from the one or more other UEs 200 and measures the interference level (for example, RSRP) based on the interference level measuring signal.

Measurement Control During Handover of Other UE 200

Furthermore, for example, when the UE 200 communicates wirelessly in the macrocell 10, the handover of other UE 200 that allows the other UE 200 to communicate wirelessly in the small cell 30 can be executed. In this case, during the handover, the controller 230 performs control for measuring the degree of interference between the UE 200 and the other UE 200.

For example, the aforementioned handover is handover that allows the other UE 200 to communicate wirelessly in the small cell 30 using a downlink frequency band of the macrocell 10. In this case, during the aforementioned handover, the controller 230 is instructed to measure the interference level between the UE 200 and the other UE 200 by the eNB 100 through the wireless communication unit 210. Then, the controller 230 causes the wireless communication unit 210 to receive an interference level measuring signal (for example, a reference signal) from the other UE 200 and measures an interference level (for example, RSRP) based on the interference level measuring signal.

Furthermore, for example, the aforementioned handover is handover that allows the other UE 200 to communicate wirelessly in the small cell 30 using an uplink frequency band of the macrocell 10. In this case, for example, during the aforementioned handover, the controller 230 is instructed to measure the interference level between the UE 200 and the other UE 200 by the eNB 100 through the wireless communication unit 210. Then, the controller 230 causes the wireless communication unit 210 to send an interference level measuring signal (for example, a reference signal).

Control of RACH-Related Parameter of UE 200

During the handover of UE 200 that allows the UE 200 to communicate wirelessly in the small cell 30 using a downlink frequency band, the controller 230 sets the RACH-related parameter of the UE 200 in accordance with the control of the eNB 100. This parameter is, for example, a transmission power of the UE 200 on the RACH.

Control of Transmission Power of UE 200 in Uplink Frequency Band

Furthermore, for example, when the UE 200 communicates wirelessly in the macrocell 10, the handover of other UE 200 that allows the other UE 200 to communicate wirelessly in the small cell 30 using an uplink frequency band can be executed. In this case, during the handover, the controller 230 sets the transmission power of the UE 200 in the uplink frequency band in accordance with the control of the eNB 100.

<<5. Process Procedure>>

An example of the communication control process according to the present embodiment is now described with reference to FIGS. 9 to 11. In the following, the communication control processes in case A, case B, and case C are described. The case A refers to a case in which an interference level measurement process is omitted. The case B refers to a case in which the handover that allows UE 200 to communicate wirelessly in a small cell 30 using a downlink frequency band is executed. The case C refers to a case in which the handover that allows UE 200 to communicate wirelessly in a small cell 30 using an uplink frequency band is executed.

(Case A: Interference Level Measurement Process is Omitted)

Figure 9:
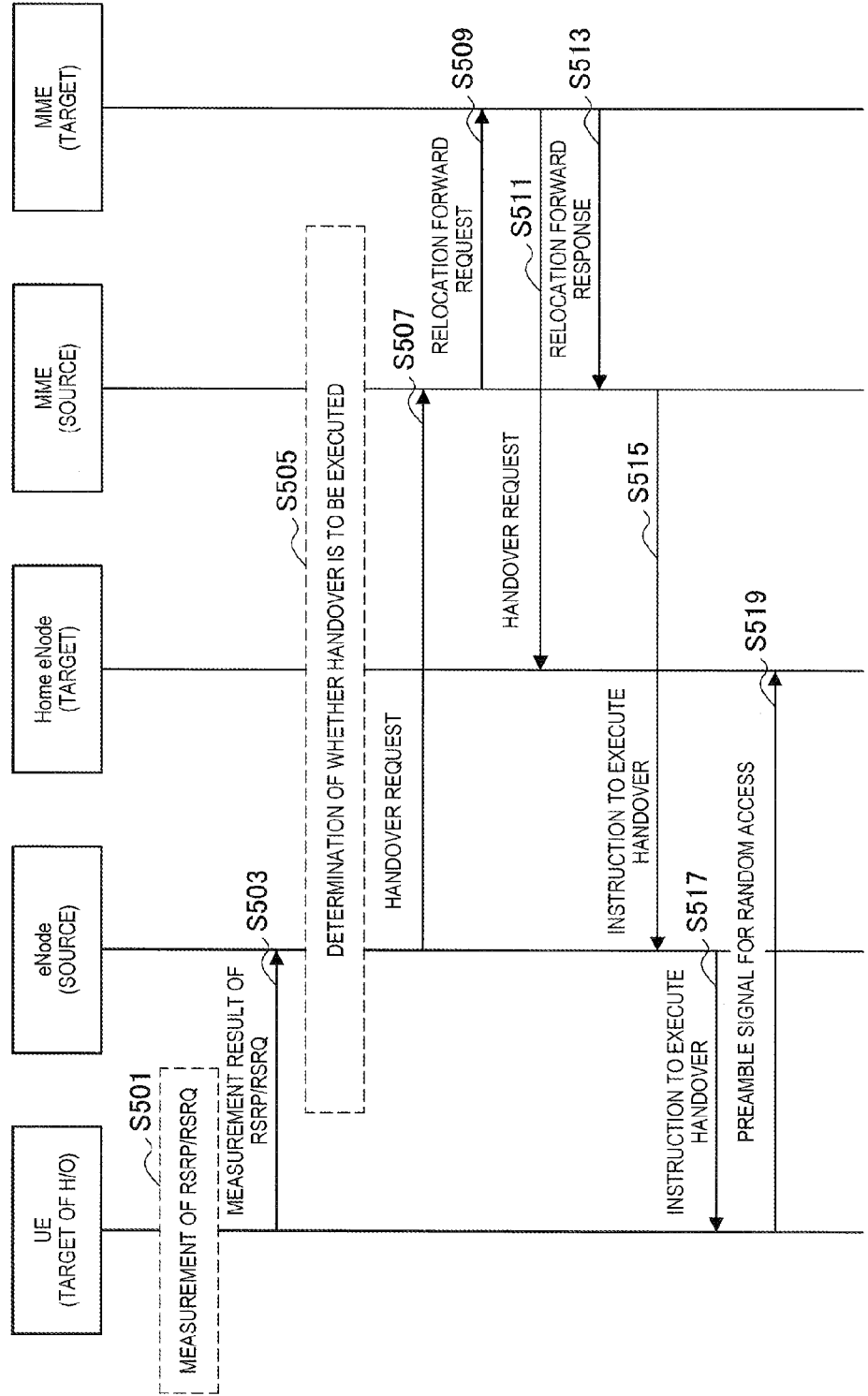
FIG. 9 is a schematic sequence diagram illustrating an exemplary procedure of a communication control process according to an embodiment in a case in which an interference level measurement process is omitted.

FIG. 9 is a schematic sequence diagram illustrating an exemplary procedure of the communication control process according to the present embodiment in a case in which the interference level measurement process is omitted. This example may be an example of the existing process procedure during handover.

In step S501, the UE 200 measures RSSP and/or the reference signal received quality (RSSQ) for the eNB 100, the HeNB 300, and other neighboring cells. For example, this measurement is performed by time averaging the RSSP and/or RSSQ based on a result obtained by receiving a reference signal over a plurality of times. Then, in step S503, the UE 200 sends the measurement result to the eNB 100.

Subsequently, in step S505, each of the eNB 100, the HeNB 300, and a mobility management entity (MME) on the side of the eNB 100 determines whether handover is to be executed based on the measurement result. In this regard, it is assumed that the handover from the macrocell 10 of the eNB 100 to the small cell 30 of the HeNB 300 is determined to be executed.

In step S507, the eNB 100 sends a handover request message to the MME on the side of the eNB 100. Next, in step S509, the MME on the side of the eNB 100 sends a relocation forward request message to the MME on the side of the HeNB 300. Then, in step S5111, the MME on the side of the HeNB 300 sends a handover request message to the HeNB 300. In step S513, the MME on the side of the HeNB 300 transmits a relocation forward response message to the MME on the side of the eNB 100.

In step S515, the MME on the side of the eNB 100 instructs the eNB 100 to perform the handover. Then, in step S517, the eNB 100 instructs the UE 200 to perform the handover. Subsequently, in step S519, the UE 200 sends a preamble signal for random access on the RACH.

(Case B: H/O for Wireless Communication Using Downlink Frequency Band)

Figure 10:
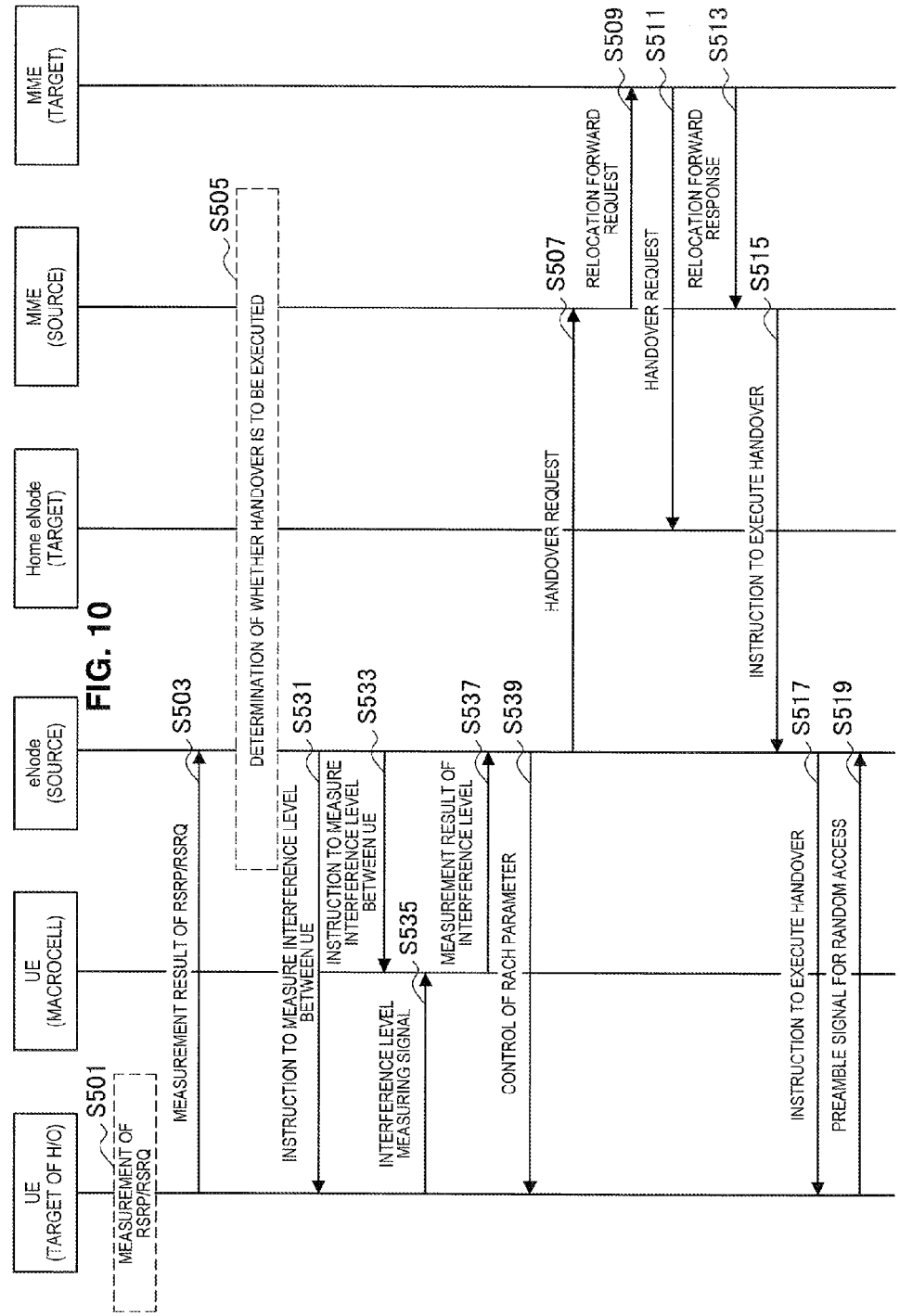
FIG. 10 is a schematic sequence diagram illustrating an exemplary procedure of a communication control process according to an embodiment in a case of executing handover that allows UE to communicate wirelessly in a small cell using a downlink frequency band.

FIG. 10 is a schematic sequence diagram illustrating an exemplary procedure of the communication control process according to the present embodiment in a case of executing the handover that allows UE 200 to communicate wirelessly in a small cell 30 using a downlink frequency band. There will be described only steps S531 to S539 of case B that are different from steps of case A.

In step S531, the eNB 100 (the measurement result acquisition unit 141) instructs a target UE 200 of handover to measure the interference level between the UE 200 and one or more other UEs 200 that communicate wirelessly in the macrocell 10. More specifically, for example, the eNB 100 instructs the target UE 200 of handover to send an interference level measuring signal (for example, a reference signal).

Furthermore, in step S533, the eNB 100 (the measurement result acquisition unit 141) instructs the one or more other UEs 200 to measure the interference level between the one or more other UEs 200 and the target UE 200 of handover. More specifically, for example, the eNB 100 instructs the one or more other UEs 200 to receive an interference level measuring signal and measure an interference level (for example, RSRP).

Next, in step S535, the target UE 200 of handover sends the interference level measuring signal to the one or more other UEs 200. In addition, each of the one or more other UEs 200 receives the interference level measuring signal and measures an interference level. Then, in step S537, each of the one or more other UEs 200 sends a measurement result to the eNB 100.

Subsequently, in step S539, the eNB 100 (the H/O control unit 143) controls the RACH-related parameter of the target UE 200 of handover based on the measurement result. More specifically, for example, the eNB 100 controls the transmission power of the target UE 200 of handover on the RACH. This control process may be executed together when there is an instruction to perform the handover in step S517. In addition, this control process may be executed indirectly through the HeNB 300 instead of being executed directly by the eNB 100.

(Case C: H/O for Wireless Communication Using Uplink Frequency Band)

Figure 11:
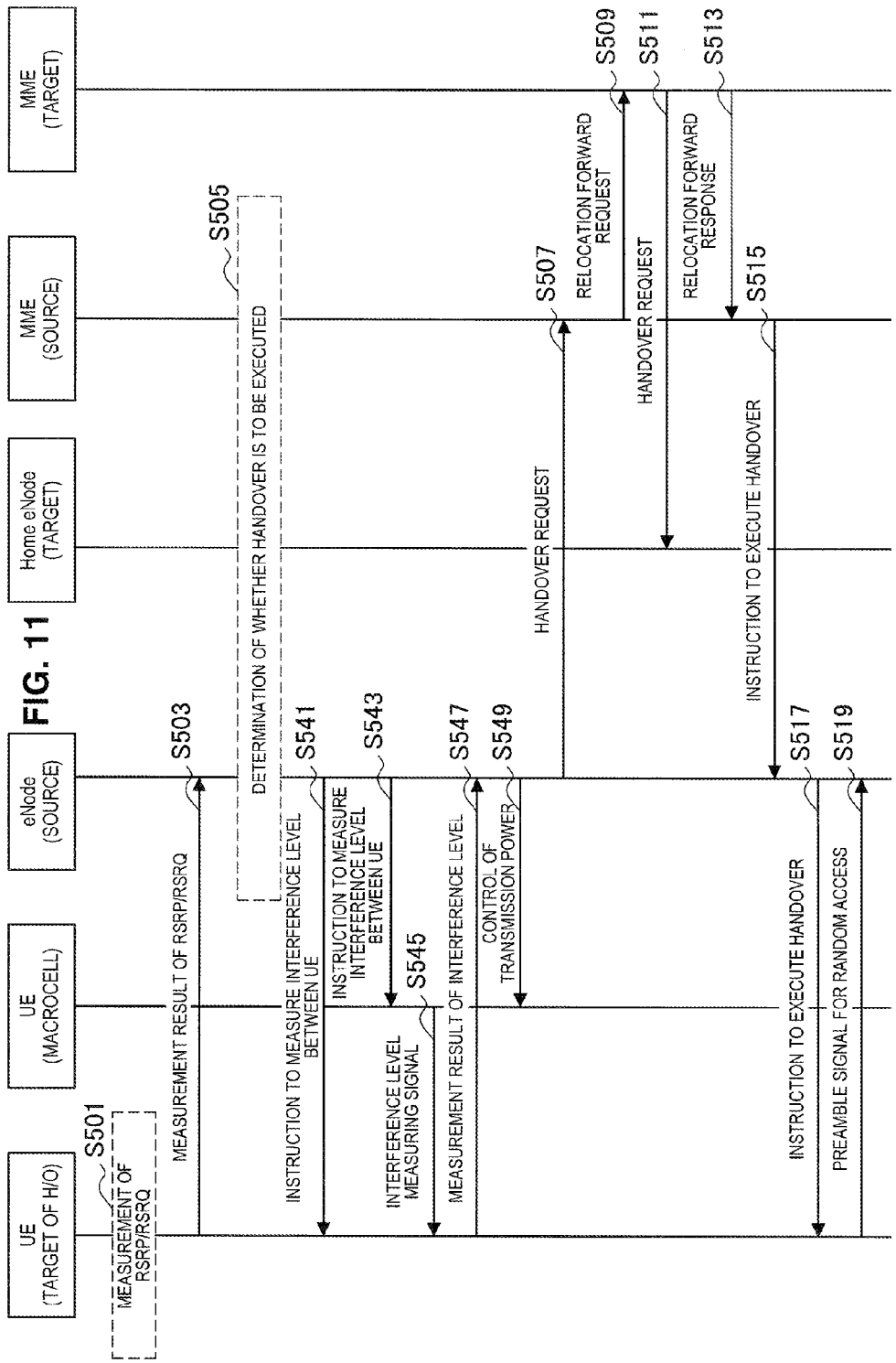
FIG. 11 is a schematic sequence diagram illustrating an exemplary procedure of a communication control process according to an embodiment in a case of executing handover that allows UE to communicate wirelessly in a small cell using an uplink frequency band.

FIG. 11 is a schematic sequence diagram illustrating an exemplary procedure of the communication control process according to the present embodiment in a case of executing the handover that allows UE 200 to communicate wirelessly in a small cell 30 using an uplink frequency band. There will be described only steps S541 to S549 of case C that are different from steps of case A.

In step S541, the eNB 100 (the measurement result acquisition unit 141) instructs a target UE 200 of handover to measure the interference level between the UE 200 and one or more other UEs 200 that communicate wirelessly in the macrocell 10. More specifically, the eNB 100 instructs the target UE 200 of handover to receive an interference level measuring signal and measure the interference level (for example, RSRP).

In step S543, the eNB 100 (the measurement result acquisition unit 141) instructs the one or more other UEs 200 to measure the interference level between the one or more other UEs 200 and the target UE 200 of handover. More specifically, the eNB 100 instructs the one or more other UEs 200 to send an interference level measuring signal (for example, a reference signal).

Next, in step S545, each of the one or more other UEs 200 sends the interference level measuring signal to the target UE 200 of handover. For example, each of the one or more other UEs 200 sends an interference level measuring signal at different times. In addition, the target UE 200 of handover receives the interference level measuring signal from each of the one or more other UEs 200 and measures the interference level. Then, in step S547, the target UE 200 of handover sends the measurement result to the eNB 100.

Then, in step S549, the eNB 100 (H/O control unit 143) controls the transmission power of the one or more other UEs 200 in the uplink frequency band based on the measurement result.

<<6. Modification>>

Figure 12:
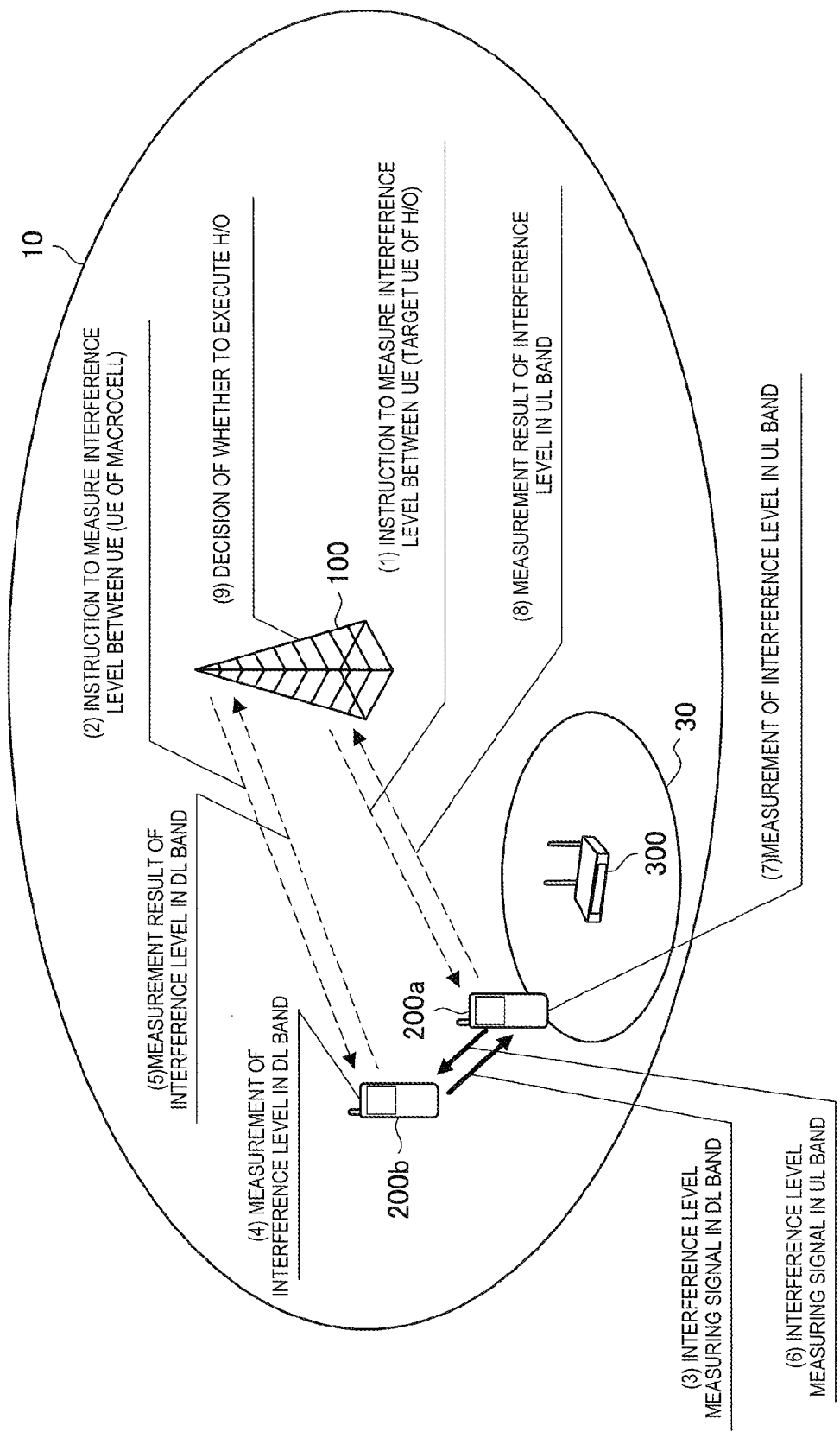
FIG. 12 is a diagram for describing an overview of the operation of a wireless communication system according to a modification for a downlink frequency band and an uplink frequency band.
Figure 13:
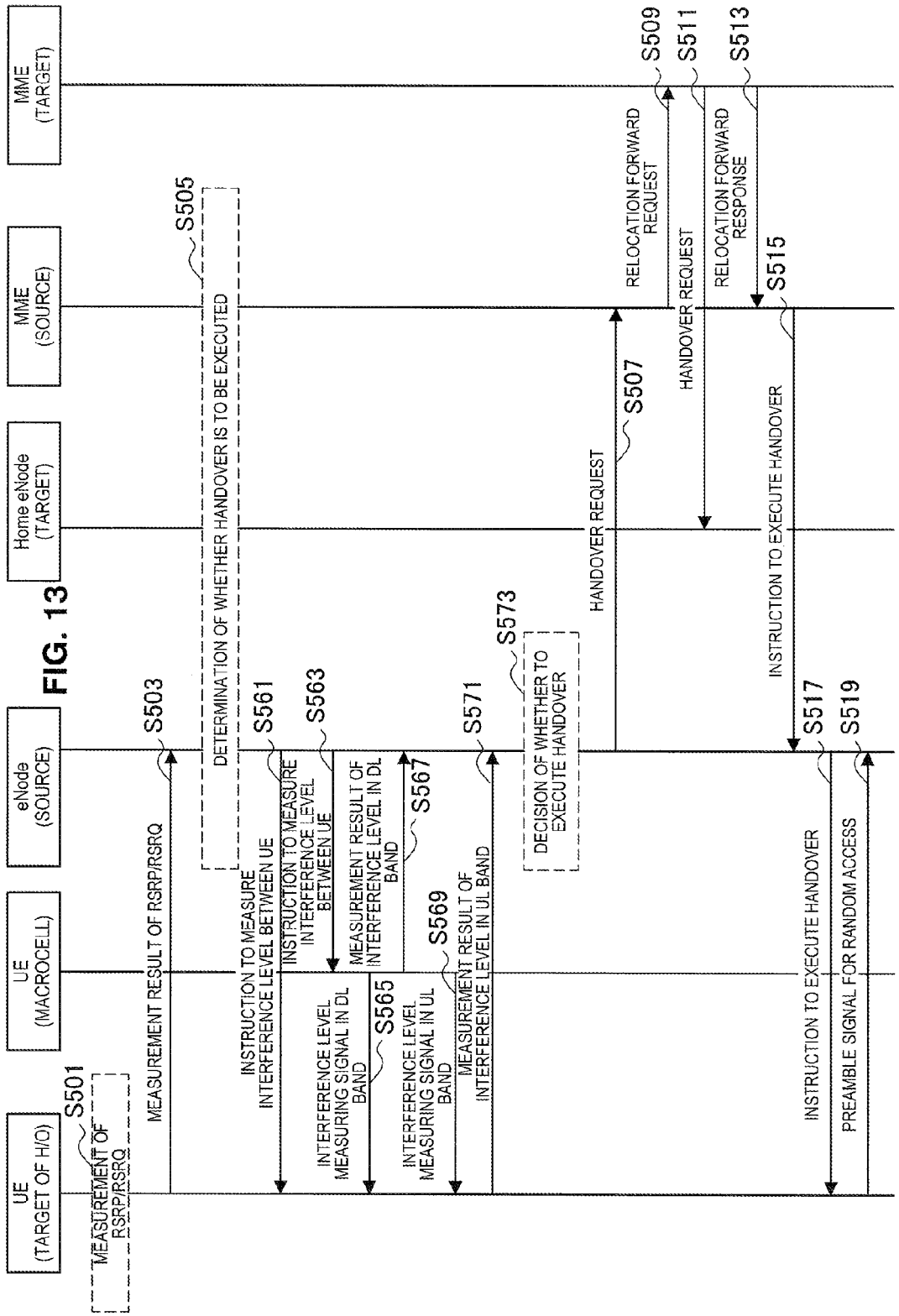
FIG. 13 is a schematic sequence diagram illustrating an exemplary procedure of a communication control process according to the modification.

A modification of the present embodiment is now described with reference to FIGS. 12 and 13. Although in the above-described embodiment the handover is executed irrespectively of the measurement result of an interference level, the present modification decides whether to execute handover based on the measurement result.

<6.1. Overview of Modification>

An overview of the modification of the present embodiment is now described with reference to FIG. 12. FIG. 12 is a diagram for describing an overview of the operation of a wireless communication system 1 according to the modification with respect to a downlink frequency band and an uplink frequency band. Referring to FIG. 12, the operation of the wireless communication system 1 with respect to a downlink frequency band and an uplink frequency band is described by the procedure of (1) to (9).

(1) The eNB 100 instructs a target UE 200a of handover to measure the interference level between the UE 200a and one or more other UEs 200.

(2) The eNB 100 instructs the one or more other UEs 200 (for example, UE 200b) that communicate wirelessly in the macrocell 10 to measure the interference level between the UE 200a and the one or more other UEs 200.

(3) The target UE 200a of handover sends an interference level measuring signal in a downlink frequency band.

(4) Each of the one or more other UEs 200 (for example, UE 200b) receives the interference level measuring signal in a downlink frequency band and measures the interference level between the UE 200a and the other UE in the downlink frequency band.

(5) Each of the one or more other UEs 200 (for example, UE 200b) sends a measurement result obtained by measuring the interference level to the eNB 100.

(6) Each of the one or more other UEs 200 (for example, UE 200b) sends an interference level measuring signal in an uplink frequency band.

(7) The target UE 200a of handover receives the interference level measuring signal in the uplink frequency band and measures the interference level between the UE 200a and each of the one or more other UEs 200 (for example, UE 200b) in the uplink frequency band.

(8) The target UE 200a of handover sends a measurement result obtained by measuring the interference level to the eNB 100.

(9) The eNB 100 decides whether to execute the handover based on the measurement result. There are various variations in the decision of whether to execute handover.

(First Example of Executing Handover)

In the first example, the aforementioned handover is inter-cell handover of UE 200 from the macrocell 10 to the small cell 30. Then, the eNB 100 decides whether to execute the handover in the downlink frequency band of the macrocell 10 and/or decides whether to execute the handover in the uplink frequency band of the macrocell 10. Then, at least one of the handover in the downlink frequency band of the macrocell 10 and the handover in the uplink frequency band of the macrocell 10 is executed.

Such decision can prevent the handover from being executed in a frequency band that is expected to occur high level of interference, thereby avoiding the high level of interference. For example, if the high level of interference is expected to occur in a downlink frequency band, handover using an uplink frequency band is executed. As a result, the occurrence of high level of interference in a downlink frequency band can be avoided. Similarly, if the high level of interference is expected to occur in an uplink frequency band, handover using a downlink frequency band is executed. As a result, the occurrence of high level of interference in an uplink frequency band can be avoided. In addition, at least one of the downlink frequency band and the uplink frequency band is executed, and thus it is also possible to avoid a condition that the UE 200 is unable to communicate wirelessly. In addition, in a frequency band at which handover is not executed, the UE 200 can be prevented from being communicated with the eNB 100 of the macrocell 10 in the small cell 30 by stopping the wireless communication.

(Second Example of Executing Handover)

In the second example, the aforementioned handover is inter-frequency handover of UE 200 in the small cell 30. The eNB 100 decides whether to execute handover based on a measurement result.

Such decision can prevent the inter-frequency handover from being executed when it is expected to occur high level of interference, thereby avoiding the high level of interference. In addition, unlike the inter-cell handover, the UE 200 is able to continue the wireless communication at least in the small cell 30 even when the inter-frequency handover is not executed, thus it is also possible to avoid a condition that the UE 200 is unable to communicate wirelessly.

(Third Example of Executing Handover)

In the third example, a plurality of frequency bands (for example, a plurality of component carriers) are used in the macrocell 10 and the small cell 30. The eNB 100 decides whether to execute handover for each frequency band among the plurality of frequency bands. This handover may be inter-cell handover or inter-frequency handover.

Such decision can prevent the handover from being executed in a frequency band that is expected to occur high level of interference, thereby avoiding the high level of interference. For example, handover is executed only for the frequency band at which high level of interference is not expected to occur among a plurality of frequency bands. As a result, the occurrence of high level of interference can be avoided.

Furthermore, if an interference level measuring signal is not allowed to be sent in a frequency band that is being unused among a plurality of frequency bands, then handover that is not allowed to be executed can be limited only to handover that causes interference actually.

An overview of the modification of the present embodiment has been described above. As an example, the example in which an interference level is measured in both the downlink frequency band and the uplink frequency band has been described. However, it should be noted that an interference level may be measured only for one of the downlink frequency band and the uplink frequency band depending on the detailed execution of handover.

<6.2. Configuration of eNodeB>

The configuration of the eNB 100 according to the modification of the present embodiment is now described. Technical features that are added to the configuration of the eNB 100 according to the aforementioned present embodiment are described.

(H/O Control Unit 143)

The H/O control unit 143 decides whether to execute the handover of UE 200 that allows the UE 200 to communicate wirelessly in the small cell 30 based on the measurement result.

First Example Described Above of Executing Handover

In a similar way to the first example of executing handover, for example, the aforementioned handover is inter-cell handover of UE 200 from the macrocell 10 to the small cell 30. The H/O control unit 143 decides whether to execute the aforementioned handover in a downlink frequency band of the macrocell 10 and/or decides whether to execute the aforementioned handover in an uplink frequency band of the macrocell 10. Then, at least one of the handover in the downlink frequency band of the macrocell 10 and the handover in the uplink frequency band of the macrocell 10 is executed.

For example, handover may be executed in a frequency band with the lower level of interference among the downlink and uplink frequency bands. In this case, furthermore, if both the frequency bands have low level of interference, then handover may be executed in both the frequency bands. Alternatively, handover is executed in a downlink frequency band, and it may be decided whether to execute handover in an uplink frequency band. Alternatively, handover is executed in an uplink frequency band, and it may be decided whether to execute handover in a downlink frequency band.

Second Example Described Above of Executing Handover

In a similar way to the second example of executing handover, the aforementioned handover may be inter-frequency handover of the UE 200 in the small cell 30. In other words, the H/O control unit 143 may decide whether to execute the inter-frequency handover of the UE 200 in the small cell 30 based on the measurement result.

In this case, for example, furthermore, H/O control unit 143 may decide which of the handover to the downlink frequency band of the macrocell 10 and the handover to the uplink frequency band of the macrocell 10 is executed. This decision makes it possible to further reduce the interference caused by the inter-frequency handover.

Third Example Described Above of Executing Handover

Moreover, like the aforementioned third example of executing handover, for example, a plurality of frequency bands (for example, a plurality of component carriers) may be used in the macrocell 10 and the small cell 30. The H/O control unit 143 may decide whether to execute handover for each frequency band of the plurality of frequency bands. In this case, the measurement result acquisition unit 141 acquires a measurement result obtained by measuring an interference level in the plurality of frequency bands during the handover.

In this case, for example, the aforementioned handover may be inter-cell handover of UE 200 from the macrocell 10 to the small cell 30. Whether to execute the aforementioned handover for each of the frequency bands may be decided. This decision can prevent the inter-cell handover from being executed in a frequency band that is expected to occur high level of interference, thereby avoiding the occurrence of high level of interference. For example, the handover in a frequency band at which high level of interference is not expected to occur among a plurality of frequency bands is executed. As a result, the occurrence of high level of interference can be avoided.

Furthermore, for example, the aforementioned handover may be the inter-frequency handover of UE 200 in the small cell 30. The H/O control unit 143 may decide for which of the plurality of frequency bands the inter-frequency handover is executed. This decision allows the inter-frequency handover to a frequency band that is expected to occur low level of interference to be executed, thereby avoiding the occurrence of high level of interference.

In this modification, in a similar way to the aforementioned embodiment, the H/O control unit 143 may, or alternatively may not, control the RACH-related parameter of the UE 200 or the transmission power of the UE 200 in the uplink frequency band based on the measurement result.

<6.3. Process Procedure>

An example of the communication control process according to the modification of the present embodiment is now described with reference to FIG. 13. FIG. 13 is a schematic sequence diagram illustrating an exemplary procedure of the communication control process according to the modification of the present embodiment. There will be described only steps S561 to S573 of the modification of the present embodiment that are different from the example of case A of the present embodiment described above with reference to FIG. 9.

In step S561, the eNB 100 (the measurement result acquisition unit 141) instructs a target UE 200 of handover to measure the interference level between the UE 200 and one or more other UEs 200 that communicate wirelessly in the macrocell 10.

Moreover, in step S563, the eNB 100 (the measurement result acquisition unit 141) instructs the one or more other UEs 200 to measure the interference level between the one or more other UEs 200 and the target UE 200 of handover.

Then, in step S565, the target UE 200 of handover sends an interference level measuring signal to the one or more other UEs 200 in a downlink frequency band. In addition, each of the one or more other UEs 200 receives the interference level measuring signal and measures an interference level. Then, in step S567, each of the one or more other UEs 200 sends the measurement result to the eNB 100.

Next, in step S569, each of the one or more other UEs 200 sends the interference level measuring signal to the target UE 200 of handover. For example, each of the one or more other UEs 200 sends an interference level measuring signal at different times. In addition, the target UE 200 of handover receives the interference level measuring signal from each of the one or more other UEs 200 and measures an interference level. Then, in step S571, the target UE 200 of handover sends a measurement result obtained by measuring the interference level to the eNB 100.

Subsequently, the eNB 100 (the H/O control unit 141) decides whether to execute the handover of the target UE 200 of handover based on the measurement result.

<<7. Conclusion>>

The components and communication control processes according to the embodiments of the present disclosure have been described above with reference to FIGS. 1 to 13. According to the present embodiments, during handover of UE 200 that allows the UE 200 to communicate wirelessly in a small cell 30, a measurement result obtained by measuring the degree of interference between the UE 200 and one or more other UEs 200 that communicate wirelessly in the macrocell 10 is acquired. Then, the handover is controlled based on the measurement result.

The measurement result makes it possible to predict the degree of interference in signal transmission from a target UE 200a of handover to one or more other UEs 200 located near the small cell 30, and thus the control of handover based on the measurement result can reduce the occurrence of interference. In other words, the occurrence of interference during the handover in a heterogeneous network can be reduced.

Furthermore, for example, the aforementioned handover is the handover that allows the UE 200 to communicate wirelessly in the small cell 30 using a downlink frequency band of the macrocell 10. The RACH-related parameter of the UE 200 is controlled based on the measurement result. In addition, the parameter is a transmission power of the UE 200 on the RACH.

The aforementioned interference can be reduced by changing the RACH-related parameter of the UE 200a (for example, a transmission power on the RACH). For example, if it is determined that the interference level is high based on the measurement result, the aforementioned interference can be reduced by further decreasing the transmission power of the UE 200a on the RACH. In this way, it is possible to reduce the interference occurred during the inter-cell handover from the macrocell 10 to the small cell 30 in a downlink frequency band. In addition, it is possible to reduce the interference occurred during the inter-frequency handover to the downlink frequency band in the small cell 30.

Furthermore, for example, the aforementioned handover is the handover that allows the UE 200 to communicate wirelessly in the small cell 30 using the uplink frequency band of the macrocell 10. The transmission power of the one or more other UEs 200 in the uplink frequency band is controlled based on the measurement result.

By changing the transmission power of the one or more other UEs 200, the aforementioned interference can be reduced. For example, if it is determined that the interference level is high based on the measurement result, the aforementioned interference can be reduced by decreasing the transmission power of UE 200 that is related to the interference among the one or more other UEs 200. In this way, it is possible to reduce the interference occurred during the inter-cell handover from the macrocell 10 to the small cell 30 in an uplink frequency band. In addition, it is possible to reduce the interference occurred during the inter-frequency handover to the uplink frequency band in the small cell 30.

Moreover, for example, it is decided whether to execute the aforementioned handover based on the measurement result. Such decision prevents the handover in a frequency band at which high level of interference is expected to occur from being executed, thereby avoiding the occurrence of high level of interference.

The preferred embodiments of the present disclosure have been heretofore described with reference to the appended drawings. It goes without saying that the embodiments of the present disclosure are not limited to the examples. It should be understood by those skilled in the art that various modifications, combinations, sub-combinations and alterations may occur depending on design requirements and other factors insofar as they are within the scope of the appended claims or the equivalents thereof.

For example, the term "small cell" as used herein may refer to any cell including picocell, femtocell, nanocell, and microcell. The small cell is any complementary cell that can increase the communication capacity of a macrocell.

For example, the wireless communication system according to the embodiment is a wireless communication system that is compliant to LTE or LTE-Advanced, but the present technology is not limited thereto. For example, the wireless communication system assumed as a premise may be a wireless communication system similar to LTE or LTE-Advanced, or alternatively, may be a wireless communication system that is compliant to a further enhanced standard of LTE or LTE-Advanced.

Moreover, in the above-mentioned embodiment, a communication control device used to control handover may be an eNodeB configured for use in an LTE or LTE-Advanced network, but the present technology is not limited thereto. For example, the communication control device may be a base station that is compliant to different communication standard or may be a device that constitutes a part of the base station. In addition, the communication control device may be a different device that controls a base station. In this case, the communication control device may be configured to include a wireless communication unit.

Furthermore, in the above embodiment, a terminal that communicates in a cell may be a UE configured for use in an LTE or LTE-Advanced network, but the present technology is not limited thereto. For example, the terminal may be a terminal that is compliant to different communication standard.

Moreover, the processing steps of the communication control processing in the present specification do not necessarily have to be executed in time series in the order described in the flowchart. For example, the processing steps in the communication control process may be executed in the order different from the order described in the flowchart, or may be executed in parallel.

Further, it is possible to create a computer program for causing hardware such as a CPU, a ROM, and a RAM which are incorporated into a communication control apparatus and a terminal to exert functions equivalent to those in the configuration of the communication control apparatus and the terminal. Further, a recording medium storing the computer program is also provided.

Additionally, the present technology may also be configured as below.

(1)

A communication control device including:

a wireless communication unit configured to communicate wirelessly with a terminal in a macrocell that is allowed to communicate wirelessly in FDD mode using a frequency band, the macrocell being overlapped in part or in whole with a small cell that is allowed to communicate wirelessly in TDD mode using the frequency band;

an acquisition unit configured to acquire a measurement result during handover of a terminal, the handover allowing the terminal to communicate wirelessly in the small cell, the measurement result being obtained by measuring a degree of interference between the terminal and one or more other terminals that communicate wirelessly in the macrocell; and a controller configured to control the handover based on the measurement result.

(2)

The communication control device according to (1), wherein the handover allows the terminal to communicate wirelessly in the small cell using a downlink frequency band of the macrocell.

(3)

The communication control device according to (2), wherein the controller controls a parameter of the terminal based on the measurement result, the parameter being related to a random access channel.

(4)

The communication control device according to (3), wherein the parameter is a transmission power of the terminal on the random access channel.

(5)

The communication control device according to any one of (3) and (4), wherein the handover includes inter-cell handover of the terminal from the macrocell to the small cell in the downlink frequency band.

(6)

The communication control device according to any one of (3) to (5), wherein the handover includes inter-frequency handover of the terminal to the downlink frequency band of the macrocell in the small cell.

(7)

The communication control device according to (1), wherein the handover allows the terminal to communicate wirelessly in the small cell using an uplink frequency band of the macrocell.

(8)

The communication control device according to (7), wherein the controller controls a transmission power of the one or more other terminals in the uplink frequency band based on the measurement result.

(9)

The communication control device according to (8), wherein the handover includes inter-cell handover of the terminal from the macrocell to the small cell in the uplink frequency band.

(10)

The communication control device according to (8) or (9), wherein the handover includes inter-frequency handover of the terminal to the uplink frequency band of the macrocell in the small cell.

(11)

The communication control device according to (1), wherein the controller decides whether to execute the handover based on the measurement result.

(12)

The communication control device according to (11), wherein the handover is inter-cell handover of the terminal from the macrocell to the small cell, wherein the controller decides whether to execute the handover in a downlink frequency band of the macrocell based on the measurement result or decides whether to execute the handover in an uplink frequency band of the macrocell based on the measurement result, and wherein at least one of the handover in the downlink frequency band of the macrocell and the handover in the uplink frequency band of the macrocell is executed.

(13)

The communication control device according to (11), wherein the handover is inter-frequency handover of the terminal in the small cell.

(14)

The communication control device according to (13), wherein the controller decides which of the handover to a downlink frequency band of the macrocell and the handover to an uplink frequency band of the macrocell is executed.

(15)

The communication control device according to (11), wherein the macrocell and the small cell use a plurality of frequency bands, wherein the acquisition unit acquires a measurement result obtained by measuring a degree of interference in the plurality of frequency bands during the handover, and wherein the controller decides whether to execute the handover for each frequency band of the plurality of frequency bands on the measurement result.

(16)

The communication control device according to (15), wherein the handover is inter-cell handover of the terminal from the macrocell to the small cell, and wherein the controller decides whether to execute the handover for each of the frequency bands.

(17)

The communication control device according to (15), wherein the handover is inter-frequency handover of the terminal in the small cell, and wherein the controller decides for which of the plurality frequency bands the handover is executed.

(18)

A communication control method including:

communicating wirelessly with a terminal in a macrocell that is allowed to communicate wirelessly in FDD mode using a frequency band, the macrocell being overlapped in part or in whole with a small cell that is allowed to communicate wirelessly in TDD mode using the frequency band;

acquiring a measurement result during handover of a terminal, the handover allowing the terminal to communicate wirelessly in the small cell, the measurement result being obtained by measuring a degree of interference between the terminal and one or more other terminals that communicate wirelessly in the macrocell; and controlling the handover based on the measurement result.

(19)

A communication control device including:

an acquisition unit configured to acquire a measurement result during handover of a terminal in a small cell that is allowed to communicate wirelessly in TDD mode using a frequency band of a macrocell that is allowed to communicate wirelessly in FDD mode using the frequency band, the handover allowing the terminal to communicate wirelessly in the small cell, the small cell being overlapped in part or in whole with the macrocell, the measurement result being obtained by measuring a degree of interference between the terminal and one or more other terminals that communicate wirelessly in the macrocell; and a controller configured to control the handover based on the measurement result.

(20)

A terminal including:

a wireless communication unit configured to communicate wirelessly with a base station of a macrocell in the macrocell that is allowed to communicate wirelessly in FDD mode using a frequency band and configured to communicate wirelessly with a base station of a small cell in the small cell, the macrocell being overlapped in part or in whole with the small cell that is allowed to communicate wirelessly in TDD mode using the frequency band; and a controller configured to perform control for measuring, during handover of the terminal, a degree of interference between the terminal and one or more other terminals that communicate wirelessly in the macrocell, the handover allowing the terminal to communicate wirelessly in the small cell, wherein the handover is controlled based on a result of the measurement.

REFERENCE SIGNS LIST 1 wireless communication system
10 macrocell
30 small cell
100 eNodeB/eNB
110 wireless communication unit
120 network communication unit
130 storage unit
140 controller
141 measurement result acquisition unit
143 handover control unit/HO control unit
200 user equipment (UE)
210 wireless communication unit
220 storage unit
230 controller
300 Home eNodeB/HeNB

The invention claimed is:

1. A communication control device, comprising:
a wireless communication unit configured to communicate wirelessly with a first terminal in a macrocell that is allowed to communicate wirelessly in a Frequency Division Duplex (FDD) mode based on a frequency band,
wherein the macrocell is one of, partially overlapped or entirely overlapped with a small cell that is allowed to communicate wirelessly in a Time Division Duplex (TDD) mode based on the frequency band;
an acquisition unit configured to acquire a measurement result during handover of the first terminal,
wherein the handover allows the first terminal to communicate wirelessly in the small cell, and
wherein the measurement result is obtained based on a measurement of a degree of interference between the first terminal and at least a second terminal that communicates wirelessly in the macrocell; and
a controller configured to:
control the handover based on the measurement result; and
control a parameter of the first terminal based on the measurement result, wherein the parameter is related to a random access channel.

2. The communication control device according to claim 1, wherein the handover allows the first terminal to communicate wirelessly in the small cell based on a downlink frequency band of the macrocell.

3. The communication control device according to claim 2, wherein the handover includes inter-cell handover of the first terminal from the macrocell to the small cell in the downlink frequency band.

4. The communication control device according to claim 2, wherein the handover includes inter-frequency handover of the first terminal to the downlink frequency band of the macrocell in the small cell.

5. The communication control device according to claim 1, wherein the parameter is a transmission power of the first terminal on the random access channel.

6. The communication control device according to claim 1, wherein the handover allows the first terminal to communicate wirelessly in the small cell based on an uplink frequency band of the macrocell.

7. The communication control device according to claim 6, wherein the controller is further configured to control a transmission power of the at least second terminal in the uplink frequency band based on the measurement result.

8. The communication control device according to claim 7, wherein the handover includes inter-cell handover of the first terminal from the macrocell to the small cell in the uplink frequency band.

9. The communication control device according to claim 7, wherein the handover includes inter-frequency handover of the first terminal to the uplink frequency band of the macrocell in the small cell.

10. The communication control device according to claim 1, wherein the controller is further configured to determine execution of the handover based on the measurement result.

11. The communication control device according to claim 10,
wherein the handover is inter-cell handover of the first terminal from the macrocell to the small cell,
wherein the controller is further configured to determine execution of the handover in one of a downlink frequency band of the macrocell or an uplink frequency band based on the measurement result, and
wherein one of the handover in the downlink frequency band of the macrocell or the handover in the uplink frequency band of the macrocell is executed.

12. The communication control device according to claim 10, wherein the handover is inter-frequency handover of the first terminal in the small cell.

13. The communication control device according to claim 12, wherein the controller is further configured to determine which of the handover to a downlink frequency band of the macrocell and the handover to an uplink frequency band of the macrocell is executed.

14. The communication control device according to claim 10,
wherein the macrocell and the small cell use a plurality of frequency bands,
wherein the acquisition unit is further configured to acquire a measurement result obtained based on a measurement of a degree of interference in the plurality of frequency bands during the handover, and
wherein the controller is further configured to determine execution of handover for each of the plurality of frequency bands on the measurement result.

15. The communication control device according to claim 14,
wherein the handover is inter-cell handover of the first terminal from the macrocell to the small cell, and
wherein the controller is further configured to determine the execution of the handover for each of the plurality of frequency bands.

16. The communication control device according to claim 14,
wherein the handover is inter-frequency handover of the first terminal in the small cell, and
wherein the controller is further configured to determine for which of the plurality of frequency bands the handover is executed.

17. A communication control method, comprising:
communicating wirelessly with a first terminal in a macrocell that is allowed to communicate wirelessly in a Frequency Division Duplex (FDD) mode based on a frequency band,
wherein the macrocell is one of partially overlapped or entirely overlapped with a small cell that is allowed to communicate wirelessly in a Time Division Duplex (TDD) mode using based on the frequency band;
acquiring a measurement result during handover of the first terminal,
wherein the handover allows the first terminal to communicate wirelessly in the small cell, and
wherein the measurement result is obtained by measuring a degree of interference between the first terminal and at least a second terminal that communicates wirelessly in the macrocell; and
controlling the handover based on the measurement result; and
controlling a parameter of the first terminal based on the measurement result, wherein the parameter is related to a random access channel.

18. A communication control device, comprising:
an acquisition unit configured to acquire a measurement result during handover of a first terminal in a small cell that is allowed to communicate wirelessly in a Time Division Duplex (TDD) mode based on a frequency band of a macrocell that is allowed to communicate wirelessly in a Frequency Division Duplex (FDD) mode based on the frequency band,
wherein the handover allows the first terminal to communicate wirelessly in the small cell,
wherein the small cell is one of, partially overlapped or entirely overlapped with the macrocell,
wherein the measurement result is obtained based on a measurement of a degree of interference between the first terminal and at least a second terminal that communicates wirelessly in the macrocell; and
a controller configured to:
control the handover based on the measurement result; and
control a parameter of the first terminal based on the measurement result, wherein the parameter is related to a random access channel.

19. A first terminal, comprising:
a wireless communication unit configured to:
communicate wirelessly with a base station of a macrocell that is allowed to communicate wirelessly in a Frequency Division Duplex (FDD) mode based on a frequency band; and
communicate wirelessly with a base station of a small cell in the small cell,
wherein the macrocell is overlapped in one of partially overlapped or entirely overlapped with the small cell that is allowed to communicate wirelessly in a Time Division Duplex (TDD) mode based on the frequency band; and
a controller configured to measure, during handover of the first terminal, a degree of interference between the first terminal and at least a second terminal that communicates wirelessly in the macrocell,
wherein the handover allows the first terminal to communicate wirelessly in the small cell,
wherein the handover is controlled based on a result of measurement, and
wherein a parameter of the first terminal is controlled based on the result of measurement, wherein the parameter is related to a random access channel.

* * * * *